United States Patent
Hayashi et al.

(10) Patent No.: US 6,350,505 B2
(45) Date of Patent: Feb. 26, 2002

(54) HIGH-DENSITY ACICULAR HEMATITE PARTICLES, NON-MAGNETIC UNDERCOAT LAYER AND MAGNETIC RECORDING MEDIUM

(75) Inventors: Kazuyuki Hayashi; Keisuke Iwasaki; Yasuyuki Tanaka; Hiroko Morii, all of Hiroshima (JP)

(73) Assignee: Toda Kogyo Corporation

( * ) Notice: Subject to any disclaimer, the term of this patent is extended or adjusted under 35 U.S.C. 154(b) by 0 days.

(21) Appl. No.: 09/758,211

(22) Filed: Jan. 12, 2001

Related U.S. Application Data

(62) Division of application No. 09/048,179, filed on Mar. 26, 1998, now Pat. No. 6,207,279.

(30) Foreign Application Priority Data

Mar. 27, 1997 (JP) ............................................. 9-094722

(51) Int. Cl.⁷ .............................................. G11B 5/733
(52) U.S. Cl. ........................ 428/141; 428/329; 428/336; 428/403; 428/694 BS; 428/694 BA
(58) Field of Search ................................. 428/141, 329, 428/336, 403, 694 BS, 694 BA

(56) References Cited

U.S. PATENT DOCUMENTS

| | | | | |
|---|---|---|---|---|
| 4,528,240 A | * | 7/1985 | Miyoshi et al. ............. | 428/323 |
| 4,917,952 A | * | 4/1990 | Katamoto et al. ........... | 428/403 |
| 5,326,635 A | * | 7/1994 | Koyama ...................... | 428/323 |
| 5,489,466 A | * | 2/1996 | Inaba et al. .................. | 428/212 |
| 5,604,015 A | * | 2/1997 | Hayashi et al. .............. | 428/144 |
| 5,750,250 A | * | 5/1998 | Hayashi et al. .............. | 428/328 |

FOREIGN PATENT DOCUMENTS

| EP | 0 732 688 A2 | 9/1986 |
|---|---|---|
| EP | 0 310 340 | 4/1989 |
| EP | 0 769 775 | 4/1997 |

\* cited by examiner

*Primary Examiner*—Stevan A. Resan
(74) *Attorney, Agent, or Firm*—Nixon & Vanderhye

(57) ABSTRACT

High-density acicular hematite particles comprise acicular hematite particles and a coat comprising an oxide of tin or oxides of tin and antimony, formed on at least a part of surfaces of said acicular hematite particles; and have an average major axial diameter of not more than 0.3 $\mu$m, a pH value of not less than 8, a soluble sodium salt content of not more than 300 ppm, calculated as Na, and a soluble sulfate content of not more than 150 ppm, calculated as $SO_4$. Such high-density acicular hematite particles is suitable as non-magnetic particles for a non-magnetic undercoat layer of a magnetic recording medium using magnetic particles containing iron as a main ingredient, have an excellent dispersibility in vehicle and a low volume resistivity.

16 Claims, No Drawings

HIGH-DENSITY ACICULAR HEMATITE PARTICLES, NON-MAGNETIC UNDERCOAT LAYER AND MAGNETIC RECORDING MEDIUM

This is a division of application Ser. No. 09/048,179, filed Mar. 26, 1998, is now U.S. Pat. No. 6,207,279 the entire content of which is hereby incorporated by reference in this application.

BACKGROUND OF THE INVENTION

The present invention relates to high-density acicular hematite particles, a non-magnetic undercoat layer containing the high-density acicular hematite particles and a magnetic recording medium having the non-magnetic undercoat layer. More particularly, the present invention relates to high-density acicular hematite particles suitable as non-magnetic particles for a non-magnetic undercoat layer of a magnetic recording medium using magnetic particles containing iron as a main ingredient, which have an excellent dispersibility in binder resin, a pH value of not less than 8, a less content of soluble sodium salts and soluble sulfates, and a high surface conductivity; a non-magnetic undercoat layer containing the high-density acicular hematite particles and suitably used for a magnetic recording medium using magnetic particles containing iron as a main ingredient; and a magnetic recording medium having the non-magnetic undercoat layer.

With a development of miniaturized and lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Various attempts have been made at both enhancing the properties of magnetic particles and reducing the thickness of a magnetic recording layer in order to improve these properties of a magnetic recording medium.

The enhancement of the properties of magnetic particles will first be described.

Magnetic particles are required to have, in order to satisfy the above-described demands on a magnetic recording medium, properties such as a high coercive force and a large saturation magnetization.

As magnetic particles suitable for high-output and high-density recording, acicular magnetic particles containing iron as a main ingredient which are obtained by heat-treating acicular goethite particles or acicular hematite particles in a reducing gas are widely known.

Acicular magnetic particles containing iron as a main ingredient have a high coercive force and a large saturation magnetization, since the acicular magnetic particles containing iron as a main ingredient used for a magnetic recording medium are very fine particles having a particle size of not more than 1 $\mu$m, particularly, 0.01 to 0.3 $\mu$m. Therefore, such particles easily corrode, and the magnetic properties thereof are deteriorated, especially, the saturation magnetization and the coercive force are reduced.

In order to maintain the characteristics of a magnetic recording medium which uses magnetic particles containing iron as a main ingredient as the magnetic particles, over a long period, it is strongly demanded to suppress the corrosion of the acicular magnetic particles containing iron as a main ingredient as much as possible.

A reduction in the thickness of a magnetic recording layer will now be described.

Video tapes have recently been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, a reduction in the thickness of a magnetic recording layer is also strongly demanded in order to improve the high output characteristics, especially, an S/N ratio of a magnetic recording medium. This fact is described, for example, on page 312 of *Development of Magnetic Materials and Technique for High Dispersion of Magnetic Powder*, published by Sogo Gijutsu Center Co., Ltd. (1982), " . . . the conditions for high-density recording in a coated-layer type tape are that the noise level is low with respect to signals having a short wavelength and that the high output characteristics are maintained. To satisfy these conditions, it is necessary that the tape has large coercive force Hc and residual magnetization Br, . . . and the coating film has a smaller thickness . . . ".

Development of a reduction in the thickness of a magnetic recording layer has caused some problems.

Firstly, it is necessary to make a magnetic recording layer smooth and to eliminate the non-uniformity of thickness. As well known, in order to obtain a smooth magnetic recording layer having a uniform thickness, the surface of the substrate must also be smooth. This fact is described on pages 180 and 181 of *Materials for Synthetic Technology-Causes of Friction and Abrasion of Magnetic Tape and Head Running System and Measures for Solving the Problem* (hereinunder referred to as "*Materials for Synthetic Technology*" (1987), published by the Publishing Department of Technology Information Center, " . . . the surface roughness of a hardened magnetic layer depends on the surface roughness of the substrate (back surface roughness) so largely as to be approximately proportional, . . . , since the magnetic layer is formed on the substrate, the more smooth the surface of the substrate is, the more uniform and larger head output is obtained, and the more the SIN ratio is improved."

Secondly, there has been caused a problem in the strength of a non-magnetic substrate such as a base film with a tendency of the reduction in the thickness of the non-magnetic substrate in response to the demand for a thinner magnetic layer. This fact is described, for example, on page 77 of the above-described *Development of Magnetic Materials and Technique for High Dispersion of Magnetic Powder*, " . . . Higher recording density is a large problem assigned to the present magnetic tape. This is important in order to shorten the length of the tape and to miniaturize the size of a cassette and to enable long-time recording. For this purpose, it is necessary to reduce the thickness of a substrate . . . With the tendency of reduction in the film thickness, the stiffness of the tape also reduces to such an extent as to make smooth travel in a recorder difficult. Therefore, improvement of the stiffness of a video tape both in the machine direction and in the transverse direction is now strongly demanded . . . "

The end portion of a magnetic recording medium such as a magnetic tape, especially, a video tape is judged by detecting a portion of the magnetic recording medium at which the light transmittance is large by a video deck. If the light transmittance of the whole part of a magnetic recording layer is made large by the thinner magnetic recording medium or the ultrafine magnetic particles dispersed in the magnetic recording layer, it is difficult to detect the portion having a large light transmittance by a video deck. For reducing the light transmittance of the whole part of a magnetic recording layer, carbon black or the like is added to the magnetic recording layer. It is, therefore, essential to add carbon black or the like to a magnetic recording layer in the present video tapes.

However, addition of a large amount of non-magnetic particles such as carbon black impairs not only the enhancement of the recording density but also the development of a thinner recording layer. Therefore in order to reduce the magnetization depth from the surface of the magnetic tape and to produce a thinner magnetic recording layer, it is strongly demanded to reduce, as much as possible, the quantity of non-magnetic particles such as carbon black which are added to a magnetic recording layer.

It is also strongly demanded that the light transmittance of a magnetic recording layer should be small even if the carbon black or the like which is added to the magnetic recording layer is reduced to a small amount. From this point of view, improvements in a substrate are now in strong demand.

Further, in order to reduce not only the above-mentioned optical transmittance but also surface resistivity of the magnetic recording medium, carbon black has been conventionally added to a magnetic recording layer thereof.

The use of carbon black in the magnetic recording medium is described in more detail below.

In the case where the magnetic recording medium has a high surface resistivity, the electrostatically charged amount on the magnetic recording medium is increased, so that cutting wastes of magnetic recording media or dusts are attached to the surface of magnetic recording medium upon production or use of the magnetic recording medium, thereby increasing occurrence of drop-out.

Consequently, in order to lower the surface resistivity of the magnetic recording medium to about $10^8$ $\Omega$cm, a conductive compound such as carbon black has been generally added to a magnetic recording layer thereof in an amount of not less than about 5 parts by weight based on 100 parts by weight of magnetic particles used therein.

However, such an increase in amount of non-magnetic substance such as carbon black in the magnetic recording layer tends to cause the deterioration in signal recording property and inhibit the reduction in thickness of the magnetic recording layer.

Various efforts have been made to improve a base film for a magnetic recording layer with a demand for a thinner magnetic recording layer and a thinner non-magnetic substrate. A magnetic recording medium having at least one undercoat layer (hereinunder referred to "non-magnetic undercoat layer") comprising a binder resin and non-magnetic particles containing iron as a main ingredient such as hematite particles which are dispersed therein, on a non-magnetic substrate such as a base film has been proposed and put to practical use (Japanese Patent Publication (KOKOKU) No. 6-93297 (1994), Japanese Patent Application Laid-Open (KOKAI) Nos. 62-159338 (1987), 63-187418 (1988), 4-167225 (1992), 4-325915 (1992), 5-73882 (1993), 5-182177 (1993), 5-347017 (1993), 6-60362 (1994), 9-35245 (1997), etc.)

Further, various attempts for reducing the content of carbon black in the magnetic recording layer and lowering the surface resistivity of the magnetic recording medium as low as possible, have been conducted. For example, it is known that the surfaces of non-magnetic particles dispersed in the above-mentioned non-magnetic undercoat layer are coated with a tin compound or an antimony compound (Japanese Patent Nos. 2566088 and 2566089, Japanese Patent Publication (KOKOKU) No. 5-33446(1993), Japanese Patent Applications Laid-open (KOKAI) Nos. 6-60360 (1994), 7-176030(1995), 8-50718(1996), 8-203063(1996), 8-255334, 9-27116(1997) or the like).

For example, Japanese Patent Application Laid-Open (KOKAI) No. 5-182177 (1993) discloses a magnetic recording medium comprising: a non-magnetic substrate; a non-magnetic undercoat layer formed on the non-magnetic substrate and produced by dispersing inorganic particles in a binder resin; and a magnetic layer formed on the non-magnetic undercoat layer and produced by dispersing ferromagnetic particles in a binder resin while the non-magnetic undercoat layer is wet; wherein the magnetic layer has a thickness of not more than 1.0 $\mu$m in a dried state, the non-magnetic undercoat layer contains non-magnetic inorganic particles with surface layers coated with an inorganic oxide, the inorganic oxide coating the surfaces of the non-magnetic inorganic particles contained in the non-magnetic undercoat layer is at least one selected from the group consisting of $Al_2O_3$, $SiO_2$ and $ZrO_2$, and the amount of the inorganic oxide coating the non-magnetic inorganic particles is 1 to 21 wt % in the case of $Al_2O_3$, 0.04 to 20 wt % in the case of $SiO_2$, and 0.05 to 15 wt % in the case of $ZrO_2$, base on the total weigh of the magnetic inorganic particles.

In Japanese Patent No. 2566088, there is described a magnetic recording medium comprising a non-magnetic substrate, a non-magnetic undercoat layer formed on the non-magnetic substrate, comprising a binder resin and non-magnetic inorganic particles dispersed in the binder resin and coated with at least one oxide selected from the group consisting of $Al_2O_3$, $SiO_2$, $ZrO_2$, $Sb_2O_3$ and ZnO, and a magnetic uppercoat layer formed on the non-magnetic undercoat layer, comprising a binder resin and ferromagnetic particles dispersed in the binder resin, wherein the magnetic uppercoat layer has a dry thickness of not more than 1.0 $\mu$m; the non-magnetic undercoat layer has a dry thickness of 0.5 to 10 $\mu$m; and the ferromagnetic particles have a major axial diameter of not more than 0.3 $\mu$m.

At present, there has been more demanded non-magnetic particles for non-magnetic undercoat layer of a magnetic recording medium, which are capable of furnishing a non-magnetic undercoat layer having excellent surface smoothness and mechanical strength by dispersing the non-magnetic particles in a binder resin; which are capable of furnishing a magnetic recording layer having a surface smoothness and a thin and uniform thickness when the magnetic recording layer is formed on the non-magnetic undercoat layer; which are capable of furnishing a magnetic recording medium having a low transmittance and a low surface resistivity; and which are capable of preventing the corrosion of magnetic particles containing iron as a main ingredient, which are dispersed in the magnetic recording layer. However, such non-magnetic particles have not been furnished yet.

That is, it has been reported that the above-mentioned conventional magnetic recording medium using hematite particles as non-magnetic particles for non-magnetic undercoat layer thereof, are improved in surface smoothness and mechanical strength of the non-magnetic undercoat layer; is capable of forming a magnetic recording layer having a surface smoothness, and a thin and uniform thickness upon the formation of the magnetic recording layer; and exhibit a low transmittance. However, these properties reported are still unsatisfactory. Especially, as described in Comparative Examples hereinafter, the surface resistivity of these conventional magnetic recording medium is as high as $10^9$ to $10^{11}$ $\Omega$cm.

On the other hand, in the case of the magnetic recording medium having the non-magnetic undercoat layer containing non-magnetic particles coated with a tin compound or an antimony compound and dispersed in a binder resin, the non-magnetic undercoat layer is deteriorated in surface smoothness and mechanical strength, though the surface resistivity thereof is low. Accordingly, the magnetic recording layer formed on such a non-magnetic undercoat layer necessarily has a rough surface and an uneven thickness, and exhibit an unsatisfactory transmittance.

Further, there has also been pointed out such a problem that the magnetic particles containing iron as a main ingredient, which are dispersed in the magnetic recording layer, undergo server corrosion after the production of the magnetic recording medium, thereby causing the considerable deterioration in magnetic properties thereof.

As a result of the present inventors' earnest studies for solving the above-mentioned problems, it has been found that by coating at least a part of surfaces of specific acicular hematite particles with an oxide of tin or an oxide of tin and antimony, and controlling the pH value to not less than 8 and contents of soluble sodium salts and soluble sulfates to a certain range, the obtained high-density acicular hematite particles exhibit a low surface resistivity and an excellent dispersibility in a vehicle. The present invention has been attained on the basis of this finding.

SUMMARY OF THE INVENTION:

It is an object of the present invention to provide non-magnetic particles for non-magnetic undercoat layer of a magnetic recording medium, which are capable of furnishing a non-magnetic undercoat layer having excellent surface smoothness and mechanical strength by dispersing the non-magnetic particles in a binder resin; which are capable of furnishing a magnetic recording layer having a surface smoothness and a thin and uniform thickness upon the formation of the magnetic recording layer; which are capable of furnishing a magnetic recording medium having a low transmittance and a low surface resistivity; and which are capable of preventing the corrosion of metal magnetic particles containing iron as a main ingredient, which are dispersed in the magnetic recording layer.

It is another object of the present invention to provide a non-magnetic undercoat layer which has excellent surface smoothness and mechanical strength, which is capable of forming thereon a magnetic recording layer, which is capable of imparting an excellent surface smoothness, a low transmittance and a low surface resistivity to the magnetic recording layer when formed on the non-magnetic undercoat layer, and which is capable of preventing metal magnetic particles containing iron as a main ingredient, which are dispersed in the magnetic recording layer, from being corroded, thereby inhibiting the deterioration in magnetic properties thereof.

It is other object of the present invention to provide a magnetic recording medium which has an excellent surface smoothness, a low transmittance and a low surface resistivity, and in which the corrosion of metal magnetic particles containing iron as a main ingredient, which are dispersed in the magnetic recording layer, is prevented, thereby inhibiting the deterioration in magnetic properties thereof.

To accomplish the aim, in a first aspect of the present invention, there is provided high-density acicular hematite particles comprising acicular hematite particles and a coat comprising an oxide of tin or oxides of tin and antimony, formed on at least a part of surfaces of the acicular hematite particles; and having an average major axial diameter of not more than 0.3 $\mu$m, a pH value of not less than 8, a soluble sodium salt content of not more than 300 ppm (calculated as Na) and a soluble sulfate content of not more than 150 ppm (calculated as $SO_4$).

In a second aspect of the present invention, there is provided high-density acicular hematite particles comprising acicular hematite particles, a first coat comprising an oxide of tin or oxides of tin and antimony, formed on at least a part of surfaces of the acicular hematite particles, and a second coat comprising at least one compound selected from the group consisting of a hydroxide of aluminum, an oxide of aluminum, a hydroxide of silicon and an oxide of silicon, formed on at least a part of surfaces of said high-density acicular hematite particles; and having an average major axial diameter of not more than 0.3 $\mu$m, a pH value of not less than 8, a soluble sodium salt content of not more than 300 ppm (calculated as Na) and a soluble sulfate content of not more than 150 ppm (calculated as $SO_4$).

In a third aspect of the present invention, there is provided a non-magnetic undercoat layer comprising the high-density acicular hematite particles set forth in the first or second aspect and a binder resin, formed on a non-magnetic substrate.

In a fourth aspect of the present invention, there is provided a magnetic recording medium comprising:
a non-magnetic substrate;
a non-magnetic undercoat layer comprising the high-density acicular hematite particles set forth in the first or second aspect and a binder resin, formed on said non-magnetic substrate; and
a magnetic recording layer comprising magnetic particles containing iron as a main ingredient and a binder resin, formed on said non-magnetic undercoat layer.

In a fifth aspect of the present invention, there is provided a process for producing high-density acicular hematite particles set forth in claim 1, comprising:
heat-dehydrating acicular goethite particles coated with a hydroxide of tin to obtain low-density acicular hematite particles;
heat-treating said low-density acicular hematite particles at a temperature of not less than 550° C. to obtain high-density acicular hematite particles coated with an oxide of tin;
wet-pulverizing a slurry containing said high-density acicular hematite particles;
adjusting the pH value of said slurry to not less than 13;
heat-treating said slurry at a temperature of not less than 80° C.; and
filtering said slurry to separate high-density acicular hematite particles therefrom, followed by washing with water and drying.

In a sixth aspect of the present invention, there is provided a process for producing high-density acicular hematite particles set forth in claim 1, comprising:
wet-pulverizing a slurry containing high-density acicular hematite particles obtained by heat-treating at a temperature of not less than 550° C. low-density acicular hematite particles produced by heat-dehydrating acicular goethite particles coated with a sintering preventive agent,;

adjusting the pH value of said slurry to not less than 13;

heat-treating said slurry at a temperature of not less than 80° C.; and filtering said slurry to separate high-density acicular hematite particles therefrom, followed by washing with water and drying;

treating the obtained high-density acicular hematite particles with an aqueous solution containing a tin compound to obtain high-density acicular hematite particles coated with a hydroxide of tin; and heat-treating said high-density acicular hematite particles coated with a hydroxide of tin at a temperature of not less than 300° C.

In a seventh aspect of the present invention, there is provided a process for producing high-density acicular hematite particles set forth in claim 1, comprising:

heat-dehydrating acicular goethite particles coated with hydroxides of tin and antimony to obtain low-density acicular hematite particles;

heat-treating said low-density acicular hematite particles at a temperature of not less than 550° C. to obtain high-density acicular hematite particles coated with oxides of tin and antimony;

wet-pulverizing a slurry containing said high-density acicular hematite particles;

adjusting the pH value of said slurry to not less than 13;

heat-treating said slurry at a temperature of not less than 80° C.; and filtering said slurry to separate high-density acicular hematite particles therefrom, followed by washing with water and drying.

In an eighth aspect of the present invention, there is provided a process for producing high-density acicular hematite particles set forth in claim 1, comprising:

wet-pulverizing a slurry containing high-density acicular hematite particles obtained by heat-treating at a temperature of not less than 550° C. low-density acicular hematite particles produced by heat-dehydrating acicular goethite particles coated with a sintering preventive agent,;

adjusting the pH value of said slurry to not less than 13;

heat-treating said slurry at a temperature of not less than 80° C.; and filtering said slurry to separate high-density acicular hematite particles therefrom, followed by washing with water and drying;

treating the obtained high-density acicular hematite particles with an aqueous solution containing a tin compound and an antimony compound to obtain high-density acicular hematite particles coated with hydroxides of tin and antimony; and heat-treating said high-density acicular hematite particles coated with hydroxides of tin and antimony at a temperature of not less than 300° C.

DETAILED DESCRIPTION OF THE INVENTION

The present invention is described in detail below.

First, the high-density acicular hematite particles in which at least a part of the surface thereof is coated with an oxide of tin or an oxide of tin and antimony, are described.

The amount of the oxide of tin coated on surface of the particles is usually 0.5 to 500% by weight (calculated as Sn) based on the weight of the acicular hematite particles. When the amount of the oxide of tin is less than 0.5% by weight, the surface of the particles cannot be satisfactorily coated with the oxide of tin as a conductive substance, so that it becomes impossible to attain a sufficient effect of reducing a surface resistivity of the magnetic recording medium. On the other hand, when the amount of the oxide of tin is more than 500% by weight, although a sufficient effect of reducing a surface resistivity of the magnetic recording medium can be obtained, the effect is already saturated and, therefore, the use of such an excessive amount of the oxide of tin is meaningless. In view of the surface resistivity of the obtained magnetic recording medium and economy of the production thereof, the amount of the oxide of tin is preferably 1.0 to 250% by weight, more preferably 2.0 to 200% by weight (calculated as Sn) based on the weight of the acicular hematite particles.

The amount of the oxide of antimony coated on surfaces of the particles is usually not more than 50% by weight, preferably 0.05 to 50% by weight (calculated as Sb) based on the weight of the acicular hematite particles. When the amount of the oxide of antimony is more than 50% by weight, although a sufficient effect of reducing a surface resistivity of the magnetic recording medium can be obtained, the effect is already saturated and, therefore, the use of such an excessive amount of the oxide of antimony is meaningless. In view of the surface resistivity of the obtained magnetic recording medium and economy of the production thereof, the amount of the oxide of antimony is more preferably 0.1 to 25% by weight (calculated as Sb) based on the weight of the acicular hematite particles.

In the case where the surface of the particles are coated with the oxide of tin and antimony, the weight ratio of tin to antimony is usually 20:1 to 1:1, preferably 15:1 to 2:1. When the amount of tin is less than that of antimony, it may become difficult to effectively reduce a surface resistivity of the magnetic recording medium. When the weight ratio of tin to antimony exceeds 20, it may become difficult to more effectively reduce a surface resistivity of the magnetic recording medium, because the amount of tin is too small.

The high-density acicular hematite particles coated with the oxide of tin or the oxides of tin and antimony according to the present invention have an average major axial diameter of not more than 0.3 $\mu$m, a pH value of not less than 8, a soluble sodium salt content of not more than 300 ppm (calculated as Na) and a soluble sulfate content of not more than 150 ppm (calculated as $SO_4$).

The high-density acicular hematite particles in the present invention have an aspect ratio (average major axial diameter/average minor axial diameter) (hereinunder referred to merely as "aspect ratio") of not less than 2:1, preferably not less than 3:1. The upper limit of the aspect ratio is usually 20:1, preferably 10:1 with the consideration of the dispersibility in the vehicle. The shape of the acicular particles here may have not only acicular but also spindle-shaped, rice ball-shaped or the like.

When the aspect ratio is less than 2:1, it is difficult to obtain a desired film strength of the magnetic recording medium.

The average major axial diameter of the high-density acicular hematite particles of the present invention is not more than 0.3 $\mu$m, preferably 0.005 to 0.3 $\mu$m. When the average major axial diameter exceeds 0.3 $\mu$m, the particle size is so large as to impair the surface smoothness. With the consideration of the dispersibility in the vehicle and the surface smoothness of the coated film, the more preferable average major axial diameter is 0.02 to 0.2 $\mu$m.

The average minor axial diameter of the high-density acicular hematite particles of the present invention is usually 0.0025 to 0.15 µm. When the average minor axial diameter is less than 0.0025 µm, dispersion in the vehicle may be unfavorably difficult. On the other hand, when the average minor axial diameter exceeds 0.15 µm, the particle size may be apt to become so large as to impair the surface smoothness. With the consideration of the dispersibility in the vehicle and the surface smoothness of the coated film, the more preferable average minor axial diameter is 0.01 to 0.10 µm.

The BET specific surface area of the high-density acicular hematite particle of the present invention is usually not less than 35 m²/g. When it is less than 35 m²/g, the acicular hematite particles may be coarse or sintering may be sometimes caused between particles, which are apt to exert a deleterious influence on the surface smoothness of the coated film. The BET surface area thereof is more preferably not less than 40 m²/g, even more preferably not less than 45 m²/g, and the upper limit thereof is usually 150 m²/g. The upper limit is preferably 100 m²/g, more preferably 80 m²/g with the consideration of the dispersibility in the vehicle.

The degree of densification ($S_{BET}/S_{TEM}$) of hematite particles is represented by the ratio of the specific surface area ($S_{BET}$) measured by a BET method and the surface area ($S_{TEM}$) calculated from the major axial diameter and the minor axial diameter which were measured from the particles in an electron micrograph.

The $S_{BET}/S_{TEM}$ value of hematite particles according to the present invention is usually 0.5 to 2.5. When the $S_{BET}/S_{TEM}$ value is less than 0.5, although the hematite particles have been densified, the particles may adhere to each other due to sintering therebetween, and the particle size may increase, so that a sufficient surface smoothness of the coated film may be not obtained. On the other hand, when the $S_{BET}/S_{TEM}$ value exceeds 2.5, there may be many pores in the surfaces of particles and the dispersibility in the vehicle may become insufficient. In consideration of the surface smoothness of the coated film and the dispersibility in the vehicle, the $S_{BET}/S_{TEM}$ value is preferably 0.7 to 2.0, more preferably 0.8 to 1.6.

The major axial diameter distribution of the high-density acicular hematite particles of the present invention is preferably not more than 1.50 in geometrical standard deviation. When it exceeds 1.50, the coarse particles existent sometimes exert a deleterious influence on the surface smoothness of the coated film. The major axial diameter distribution is more preferably not more than 1.40, even more preferably not more than 1.35 in geometrical standard deviation with the consideration of the surface smoothness of the coated film. From the point of view of industrial productivity, the major axial diameter distribution of the high-density acicular hematite particles obtained is usually 1.01 in geometrical standard deviation.

The pH value of the high-density acicular hematite particles of the present invention is not less than 8. When it is less than 8, the magnetic particles containing iron as a main ingredient contained in the magnetic recording layer formed on the non-magnetic undercoat layer are gradually corroded, thereby causing a deterioration in the magnetic properties. With the consideration of a corrosion preventive effect on the magnetic particles containing iron as a main ingredient, the pH value of the particles is preferably not less than 8.5, more preferably not less than 9.0. The upper limit is usually 12, preferably 11, more preferably 10.5.

The content of soluble sodium salts in the high-density acicular hematite particles of the present invention is not more than 300 ppm soluble sodium (calculated as Na). When it exceeds 300 ppm, the magnetic particles containing iron as a main ingredient contained in the magnetic recording layer formed on the non-magnetic undercoat layer are gradually corroded, thereby causing a deterioration in the magnetic properties. In addition, the dispersion property of the high-density acicular hematite particles in the vehicle is easily impaired, and the preservation of the magnetic recording medium is deteriorated and efflorescence is sometimes caused in a highly humid environment. With the consideration of a corrosion preventive effect on the magnetic particles containing iron as a main ingredient, the content of soluble sodium salt is preferably not more than 250 ppm, more preferably not more than 200 ppm, even more preferably not more than 150 ppm. From the point of view of industry such as productivity, the lower limit thereof is preferably about 0.01 ppm.

The content of soluble sulfate in the high-density acicular hematite particles of the present invention is not more than 150 ppm soluble sulfate (calculated as $SO_4$). When it exceeds 150 ppm, the magnetic particles containing iron as a main ingredient contained in the magnetic recording layer formed on the non-magnetic undercoat layer are gradually corroded, thereby causing a deterioration in the magnetic properties. In addition, the dispersion property of the high-density acicular hematite particles in the vehicle is easily impaired, and the preservation of the magnetic recording medium is deteriorated and efflorescence is sometimes caused in a highly humid environment. With the consideration of a corrosion preventive effect on the magnetic particles containing iron as a main ingredient, the content of soluble sulfate is preferably not. more than 70 ppm, more preferably not more than 50 ppm. From the point of view of industry such as productivity, the lower limit thereof is preferably about 0.01 ppm.

The high-density acicular hematite particles according to the present invention in which at least a part of the surface thereof is coated with the oxide of tin or the oxide of tin and antimony, have a volume resistivity of $10^3$ to $5 \times 10^7$ Ωcm. When the volume resistivity of acicular hematite particles is more than $10^8$ Ωcm, it may become difficult to obtain a magnetic recording medium having a sufficiently low surface resistivity.

At least a part of the surfaces of the high-density acicular hematite particles coated of the present invention may be coated with at least one selected from the group consisting of a hydroxide of aluminum, an oxide of aluminum, a hydroxide of silicon and an oxide of silicon. When the acicular hematite particles coated with the above-described coating material are dispersed in a vehicle, they have an affinity with the binder resin and it is easy to obtain a desired dispersibility.

The amount of aluminum hydroxide, aluminum oxide, silicon hydroxide or silicon oxide used as the coating material is usually not less than 50 wt %, preferably 0.01 to 50 wt % (calculated as Al or $SiO_2$). When it is less than 0.01 wt %, the dispersibility improving effect may be insufficient. When the amount exceeds 50 wt %, the coating effect becomes saturated, so that it is meaningless to add a coating material more than necessary. From the point of view of dispersibility in the vehicle, the preferable amount of coating material is preferably 0.05 to 20 wt % (calculated as Al or $SiO_2$).

Various properties of the high-density acicular hematite particles coated with a coating material of the present invention, such as aspect ratio, average major axial diameter, average minor axial diameter, pH value, the content of soluble sodium salt, content of soluble sulfate, BET specific surface area, major axial diameter distribution, degree of densification, and volume resistivity are approximately equivalent in values to those of the high-density acicular hematite particles of the present invention the surfaces of which are not coated with a coating material.

A non-magnetic undercoat layer and a magnetic recording medium according to the present invention will now be explained.

The magnetic medium of according to the present invention comprises a non-magnetic substrate, a non-magnetic undercoat layer and a magnetic recording layer.

The non-magnetic undercoat layer of the present invention is produced by forming a coating film on the non-magnetic substrate and drying the coating film. The non-magnetic coating film is formed by applying to the surface of the non-magnetic substrate a non-magnetic coating composition which contains the high-density acicular hematite particles, a binder resin and a solvent.

As the non-magnetic substrate, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic substrate varies depending upon the material, but it is usually about 1.0 to 300 $\mu$m, preferably 2.0 to 200 $\mu$m. In the case of a magnetic disc, polyethylene terephthalate is ordinarily used as the non-magnetic substrate. The thickness thereof is usually 50 to 300 $\mu$m, preferably 60 to 200 $\mu$m. In the case of a magnetic tape, when polyethylene terephthalate is used as the non-magnetic substrate, the thickness thereof is usually 3 to 100 $\mu$m, preferably 4 to 20 $\mu$m. When polyethylene naphthalate is used, the thickness thereof is usually 3 to 50 $\mu$m, preferably 4 to 20 $\mu$m. When polyamide is used, the thickness thereof is usually 2 to 10 $\mu$m, preferably 3 to 7 $\mu$m.

The thickness of the non-magnetic undercoat layer obtained by coating the non-magnetic substrate with a coating composition and drying the coating film, is usually 0.2 to 10.0 $\mu$m, preferably 0.5 to 5.0 $\mu$m. When the thickness is less than 0.2 $\mu$m, not only it is impossible to ameliorate the surface roughness of the non-magnetic substrate but also the strength is insufficient.

As the binder resin in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof. Each of these resin binders may contain a functional group such as —OH, —COOH, —SO$_3$M, —OP$_2$M$_2$ and —NH$_2$, wherein M represents H, Na or K. With the consideration of the dispersibility of the particles, a binder resin containing a functional group —COOH or —SO$_3$M is preferable.

The mixing ratio of the high-density acicular hematite particles with the binder resin is usually 5 to 2000 parts by weight, preferably 100 to 1000 parts by weight based on 100 parts by weight of the binder resin.

It is possible to add a lubricant, a polishing agent, an antistatic agent, etc. which are generally used for the production of a magnetic recording medium to the non-magnetic undercoat layer.

The gloss of the coated film of the non-magnetic undercoat layer containing high-density acicular hematite particles according to the present invention is usually 180 to 280%, preferably 185 to 280%, more preferably 187 to 280% and the surface roughness Ra thereof is usually 2.0 to 13.0 nm, preferably 2.0 to 11.0 nm, more preferably 2.0 to 10.0 nm. The Young's modulus (relative value to a commercially available video tape: AV T-120 produced by Victor Company of Japan, Limited) thereof is usually 115 to 150, preferably 120 to 150, more preferably 125 to 150.

The magnetic recording medium according to the present invention is produced by forming the non-magnetic undercoat layer formed on the non-magnetic substrate, forming a coating film on the non-magnetic undercoat layer by applying a coating composition containing magnetic particles containing iron as a main ingredient, a binder resin and a solvent, and drying the coating film to obtain a magnetic recording layer.

The magnetic particles containing iron as a main ingredient used in the present invention comprises iron or iron and at least one selected from the group consisting of Co, Al, Ni, P, Si, Zn, Ti, Cu, B, Nd, La and Y. Further, the following magnetic particles containing iron as a main ingredient may be exemplified.

1) Magnetic particles containing iron as a main ingredient comprises iron and usually 0.05 to 10 wt%, preferably 0.1 to 7 wt % of aluminum (calculated as Al) based on the weight of the magnetic particles containing iron as a main ingredient.

2) Magnetic particles containing iron as a main ingredient comprises iron; usually 0.05 to 10 wt %, preferably 0.1 to 7 wt % of aluminum (calculated as Al) based on the weight of the magnetic particles containing iron as a main ingredient; and usually 0.05 to 40 wt %, preferably 1.0 to 35 wt %, more preferably 3 to 30 wt % of cobalt (calculated as Co) based on the weight of the magnetic particles containing iron as a main ingredient.

3) Magnetic particles containing iron as a main ingredient comprises iron; usually 0.05 to 10 wt %, preferably 0.1 to 7 wt % of aluminum (calculated as Al) based on the weight of the magnetic particles containing iron as a main ingredient; and usually 0.05 to 10 wt %, preferably 0.1 to 7 wt % of at least one selected from the group consisting of Nd, La and Y (calculated as the corresponding element) based on the weight of the magnetic particles containing iron as a main ingredient.

4) Magnetic particles containing iron as a main ingredient comprises iron; usually 0.05 to 10 wt %, preferably 0.1 to 7 wt % of aluminum (calculated as Al) based on the weight of the magnetic particles containing iron as a main ingredient; usually 0.05 to 40 wt %, preferably 1.0 to 35 wt %, more preferably 3 to 30 wt % of cobalt (calculated as Co) based on the weight of the magnetic particles containing iron as a main ingredient;; and usually 0.05 to 10 wt %, preferably 0.1 to 7 wt % of at least one selected from the group consisting of Nd, La and Y (calculated as the corresponding element) based on the weight of the magnetic particles containing iron as a main ingredient.

5) Magnetic particles containing iron as a main ingredient comprises iron; usually 0.05 to 10 wt %, preferably 0.1 to 7 wt % of aluminum (calculated as Al) based on the weight of the magnetic particles containing iron as a main ingredient;

and usually 0.05 to 10 wt %, preferably 0.1 to 7 wt % of at least one selected from the group consisting of Ni, P, Si, Zn, Ti, Cu and B (calculated as the corresponding element) based on the weight of the magnetic particles containing iron as a main ingredient.

6) Magnetic particles containing iron as a main ingredient comprises iron; usually 0.05 to 10 wt %, preferably 0.1 to 7 wt % of aluminum (calculated as Al) based on the weight of the magnetic particles containing iron as a main ingredient; usually 0.05 to 40 wt %, preferably 1.0 to 35 wt %, more preferably 3 to 30 wt % of cobalt (calculated as Co) based on the weight of the magnetic particles containing iron as a main ingredient; and usually 0.05 to 10 wt %, preferably 0.1 to 7 wt % of at least one selected from the group consisting of Ni, P, Si, Zn, Ti, Cu and B (calculated as the corresponding element) based on the weight of the magnetic particles containing iron as a main ingredient.

7) Magnetic particles containing iron as a main ingredient comprises iron; usually 0.05 to 10 wt %, preferably 0.1 to 7 wt % of aluminum (calculated as Al) based on the weight of the magnetic particles containing iron as a main ingredient; usually 0.05 to 10 wt %, preferably 0.1 to 7 wt % of at least one selected from the group consisting of Nd, La and Y (calculated as the corresponding element) based on the weight of the magnetic particles containing iron as a main ingredient; and usually 0.05 to 10 wt %, preferably 0.1 to 7 wt % of at least one selected from the group consisting of Ni, P, Si, Zn, Ti, Cu and B (calculated as the corresponding element) based on the weight of the magnetic particles containing iron as a main ingredient.

8) Magnetic particles containing iron as a main ingredient comprises iron; usually 0.05 to 10 wt %, preferably 0.1 to 7 wt % of aluminum (calculated as Al) based on the weight of the magnetic particles containing iron as a main ingredient; usually 0.05 to 40 wt %, preferably 1.0 to 35 wt %, more preferably 3 to 30 wt % of cobalt (calculated as Co) based on the weight of the magnetic particles containing iron as a main ingredient; usually 0.05 to 10 wt %, preferably 0.1 to 7 wt % of at least one selected from the group consisting of Nd, La and Y (calculated as the corresponding element) based on the weight of the magnetic particles containing iron as a main ingredient; and usually 0.05 to 10 wt %, preferably 0.1 to 7 wt % of at least one selected from the group consisting of Ni, P, Si, Zn, Ti, Cu and B (calculated as the corresponding element) based on the weight of the magnetic particles containing iron as a main ingredient.

The iron content in the particles is the balance, and is preferably 50 to 99 wt %, more preferably 60 to 95 wt % (calculated as Fe) based on the weight of the magnetic particles containing iron as a main ingredient.

The magnetic particles containing iron as a main ingredient comprising (i) iron and Al; (ii) iron, Al and Co, (iii) iron, Al and at least one rare-earth metal such as Nd, La and Y, or (iv) iron, Al, Co and at least one rare-earth metal such as Nd, La and Y, are preferable from the point of the durability of the magnetic recording medium. Further, the magnetic particles containing iron as a main ingredient comprising iron, Al and at least one rare-earth metal such as Nd, La and Y, are more preferable.

The acicular magnetic particles containing iron as a main ingredient used in the present invention have an average major axial diameter of usually 0.01 to 0.50 $\mu$m, preferably 0.03 to 0.30 $\mu$m, more preferably 0.03 to 0.25 $\mu$m, an average minor axial diameter of usually 0.0007 to 0.17 $\mu$m, preferably 0.003 to 0.10 $\mu$m, and an aspect ratio of usually not less than 3:1, preferably and not less than 5:1. The upper limit of the aspect ratio is usually 15:1, preferably 10:1 with the consideration of the dispersibility in the vehicle. The shape of the acicular magnetic particles containing iron as a main ingredient may have not only acicular but also. a spindle-shaped, rice ball-shaped or the like.

As to the magnetic properties of the acicular magnetic particles containing iron as a main ingredient used in the present invention, the coercive force is preferably 1200 to 3200 Oe, more preferably 1500 to 3200 Oe, and the saturation magnetization is preferably 100 to 170 emu/g, more preferably 130 to 170 emu/g with the consideration of the properties such as high-density recording.

As the binder resin for the magnetic recording layer, the same binder resin as that used for the production of the non-magnetic undercoat layer is usable.

The thickness of the magnetic recording layer obtained by applying the magnetic coating composition to the non-magnetic undercoat layer and dried, is ordinarily in the range of 0.01 to 5.0 $\mu$m. When the thickness is less than 0.01 $\mu$m, uniform coating may be difficult, so that unfavorable phenomenon such as unevenness on the coating surface is observed. On the other hand, when the thickness exceeds 5.0 $\mu$m, it may be difficult to obtain desired signal recording property due to an influence of diamagnetism. The preferable thickness is in the range of 0.05 to 1.0 $\mu$m.

The mixing ratio of the acicular magnetic particles containing iron as a main ingredient with the binder resin in the magnetic recording layer is usually 200 to 2000 parts by weight, preferably 300 to 1500 parts by weight based on 100 parts by weight of the binder resin.

It is possible to add a lubricant, a polishing agent, an antistatic agent, etc. which are generally used for the production of a magnetic recording medium to the magnetic recording layer.

The magnetic recording medium according to the present invention has a coercive force of usually 900 to 3500 Oe, preferably 1000 to 3500 Oe, more preferably 1500 to 3500 Oe; a squareness (residual magnetic flux density Br/saturation magnetic flux density Bm) of usually 0.85 to 0.95, preferably 0.87 to 0.95; a gloss (of the coating film) of usually 195 to 300%, preferably 200 to 300%; a surface roughness Ra (of the coating film) of usually not more than 11.0 nm, preferably 1.0 to 10.0 nm, more preferably 1.0 to 9.0 nm; a Young's modulus (relative value to a commercially available video tape: AV T-120 produced by Victor Company of Japan, Limited) of usually not less than 125, preferably not less than 130; a linear adsorption coefficient (of the coating film) of usually 1.10 to 2.00 $\mu m^{-1}$, preferably 1.20 to 2.00 $\mu m^{-1}$. ; and a surface resistivity (of the coating film) of usually $10^4$ to $5 \times 10^8$ $\Omega$/sq, preferably $10^4$ to $4.5 \times 10^8$ $\Omega$/sq, more preferably 104 to $4 \times 10^8$ $\Omega$/sq.

The corrosiveness represented by a percentage (%) of change in the coercive force is usually not more than 10.0%, preferably not more than 9.5%, and the corrosiveness represented by a percentage (%) of change in the saturation magnetic flux density Bm is usually not more than 10.0%, preferably not more than 9.5%.

Next, the process for producing the high-density acicular hematite particles coated with an oxide of tin or both an oxide of tin and an oxide of antimony according to the present invention, is described below.

As a starting material for the acicular hematite particles, there may be used acicular goethite particles.

In order to produce the high-density acicular hematite particles of the present invention, acicular goethite particles are produced. Acicular goethite particles are produced by an ordinary method:

(A) a method of oxidizing a suspension having a pH value of not less than 11 and containing colloidal ferrous hydroxide particles which is obtained by adding not less than an equivalent of an alkali hydroxide solution to an aqueous ferrous salt solution, by passing an oxygen-containing gas thereinto at a temperature of not higher than 80° C.;

(B) a method of producing acicular goethite particles by oxidizing a suspension containing $FeCO_3$ which is obtained by reacting an aqueous ferrous salt solution with an aqueous alkali carbonate solution, by passing an oxygen-containing gas thereinto after aging, if necessary, the suspension;

(C) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, adding not less than an equivalent of an alkali hydroxide solution to the $Fe^{2+}$ in the aqueous ferrous salt solution, to the aqueous ferrous salt solution containing the acicular goethite seed particles, and passing an oxygen-containing gas into the aqueous ferrous salt solution; and (D) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, and growing the obtained acicular seed goethite particles in an acidic or neutral region.

Elements other than Fe such as Ni, Zn, P, Al and Si, which are generally added in order to enhance various properties of the particles such as the major axial diameter, the minor axial diameter and the aspect ratio, may be added during the reaction system for producing the goethite particles.

The acicular goethite particles obtained have an average major axial diameter of usually 0.005 to 0.4 μm, an average minor axial diameter of usually 0.0025 to 0.20 μm and a BET specific of about usually 50 to 250 m$^2$/g, and contain ordinarily soluble sodium salts of 300 to 1500 ppm soluble sodium (calculated as Na) and ordinarily soluble sulfates of 100 to 3000 ppm soluble sulfate (calculated as $SO_4$).

The surfaces of the above-mentioned acicular goethite particles are then coated with a hydroxide of tin or hydroxides of tin and antimony.

In the coating-treatment, a tin compound or a tin compound and an antimony compound is added to a water suspension obtained by dispersing the acicular goethite particles in an aqueous solution. The suspension is stirred and if required, the pH value of the suspension is adjusted properly to coat the acicular goethite particles with the hydroxide of tin or the hydroxides of tin and antimony. Then, the suspension is then filtered to separate the coated acicular goethite particles therefrom. The coated acicular goethite particles is further washed with water, dried and pulverized.

As the tin compound added, there may be exemplified alkali stannates such as sodium stannate, tin salts such as stannous chloride, stannic chloride, stannous sulfate, stannic sulfate, stannous nitrate, stannic nitrate, stannous acetate or stannic acetate, or the like. The amount of the tin compound added is usually 0.5 to 500% by weight, preferably 1 to 250% by weight (calculated as Sn) based on the weight of the acicular goethite particles. When the amount of the tin compound added is less than 0.5% by weight, the acicular goethite particles cannot be sufficiently coated with the hydroxide of tin. On the other hand, when the amount of the tin compound added is more than 500% by weight, the effect by the addition is saturated and, therefore, the addition of such an excessive amount of the tin compound is meaningless.

As the antimony compound added, there may be exemplified antimony salts such as antimonous chloride, antimonic chloride or antimony sulfate. The amount of the antimony compound added is usually not more than 50% by weight, preferably 0.05 to 50% by weight (calculated as Sb) based on the weight of the acicular goethite particles. When the amount of the antimony compound added is more than 50% by weight, the effect by the addition is saturated and, therefore, the addition of such an excessive amount of the antimony compound is meaningless.

The thus obtained acicular goethite particles coated with the hydroxide of tin or the hydroxides of tin and antimony are heated at a temperature as high as not less than 550° C. to produce high-density acicular hematite particles. Alternatively, the coated acicular goethite particles may be heat-dehydrated at a temperature of 250 to 500° C. form low-density acicular hematite particles, and then, are heat-treated at a temperature as high as not less than 550° C. to produce high-density acicular hematite particles. In order to obtain the high-density acicular hematite particles maintaining the shape or configuration of original acicular goethite particles, the latter method is preferred.

It is preferred to coat the particles with a sintering preventive before the heat-treatment at a high temperature in order to obtain high-density acicular hematite particles which retain the shapes of the acicular goethite particles. The acicular goethite particles coated with a sintering preventive contain soluble sodium salts of usually 500 to 2000 ppm soluble sodium (calculated as Na) and soluble sulfates of usually 300 to 3000 ppm soluble sulfate (calculated as $SO_4$), and have the BET specific surface area of usually about 50 to 250 m$^2$/g. The coating-treatment using a sintering preventive is composed of the steps of: adding a sintering preventive to an aqueous suspension containing the acicular goethite particles, mixing and stirring the suspension, filtering out the particles, washing the particles with water, and drying the particles.

Incidentally, in the case of the acicular goethite particles coated with the hydroxide of tin or the hydroxides of tin and antimony, the hydroxide of tin or the hydroxides of tin and antimony works on as sintering-preventive agent, and therefore, such coated acicular goethite particles may further be coated with the sintering-preventive agent.

The amount of sintering preventive existent on the surfaces of the acicular hematite particles of the present invention varies depending upon various conditions such as the kind of sintering preventive, the pH value thereof in an aqueous alkali solution and the heating temperature, it is usually not more than 10 wt %, preferably 0.05 to 10 wt % based on the total weight of the particles.

As the sintering preventive, sintering preventives generally used are usable. For example, phosphorus compounds such as sodium hexametaphosphate, polyphospholic acid and orthophosphoric acid; silicon compounds such as #3 water glass, sodium orthosilicate, sodium metasilicate and colloidal silica; boron compounds such as boric acid; aluminum compounds including aluminum salts such as aluminum acetate, aluminum sulfate, aluminum chloride and aluminum nitride, alkali aluminate such as sodium aluminate, and alumina sol and aluminum hydroxide; and titanium compounds such as titanyl sulfate may be exemplified.

The low-density acicular hematite particles obtained by heat-treating the acicular goethite particles coated with a sintering preventive at a temperature of 250 to 500° C. have an average major axial diameter of usually 0.005 to 0.30 $\mu$m, an average minor axial diameter of usually 0.0025 to 0.15 $\mu$m, a BET specific surface area of usually about 70 to 350 $m^2/g$ and contain soluble sodium salts of usually 500 to 2000 ppm soluble sodium (calculated as Na) and soluble sulfates of usually 300 to 4000 ppm soluble sulfate (calculated as $SO_4$). When the temperature for heat-treating the goethite particles is less than 250° C., the dehydration reaction takes a long time. On the other hand, When the temperature exceeds 500° C. , the dehydration reaction is abruptly brought out, so that it is difficult to retain the shapes because the sintering between particles is caused. The low-density acicular hematite particles obtained by heat-treating the goethite particles at a low temperature are low-density particles having a large number of dehydration pores through which $H_2O$ is removed from the goethite particles and the BET specific surface area thereof is about 1.2 to 2 times larger than that of the acicular goethite particles as the starting material.

The low-density hematite particles are then heat-treated at a temperature of not less than 550° C. to obtain a high-density acicular hematite particles. The upper limit of the heating temperature is preferably 850° C. The high-density hematite particles contain soluble sodium salts of usually 500 to 4000 ppm soluble sodium (calculated as Na) and soluble sulfates of usually 300 to 5000 ppm soluble sulfate (calculated as $SO_4$), and the BET specific surface area thereof is usually about 35 to 150 $m^2/g$.

When the heat-treating temperature is less than 550° C., since the densification is insufficient, a large number of dehydration pores exist within and on the surface of the hematite particles, so that the dispersion in the vehicle is insufficient. Further, when the non-magnetic undercoat layer is formed from these particles, it is difficult to obtain a coated film having a smooth surface. On the other hand, when the temperature exceeds 850° C., although the densification of the hematite particles is sufficient, since sintering is caused on and between particles, the particle size increases, so that it is difficult to obtain a coated film having a smooth surface.

The obtained acicular hematite particles are pulverized by a dry-process, and formed into a slurry. The obtained slurry is then pulverized by a wet-process so as to deagglomerate coarse particles. In the wet-pulverization, ball mill, sand grinder, colloid mill or the like is used and wet-pulverization is conducted until coarse particles having a particle size of at least 44 $\mu$m are substantially removed. That is, the wet-pulverization is carried out until the amount of the coarse particles having a particle size of not less than 44 $\mu$m becomes to usually not more than 10% by weight, preferably not more than 5% by weight, more preferably 0% by weight based on the total weight of the particles. When the amount of the coarse particles having a particle size of not less than 44 $\mu$m is more than 10% by weight, the effect of treating the particles in an aqueous alkali solution at the next step is not attained.

The acicular hematite particles with coarse particles removed therefrom are heat-treated in a slurry at a temperature of usually not less than 80° C. after the pH value of the slurry is adjusted to not less than 13 by adding an aqueous alkali solution such as sodium hydroxide.

The concentration of the alkali suspension containing the acicular hematite particles and having a pH value of not less than 13 is preferably 50 to 250 g/liter.

When the pH value of the alkali suspension containing the acicular hematite particles is less than 13, it is impossible to effectively remove the solid crosslinking caused by the sintering preventive which exists on the surfaces of the hematite particles, so that it is impossible to wash out the soluble sodium slat, soluble sulfate, etc. existing within and on the surfaces of the particles. The upper limit of the pH value is usually about 14. When the effect of removing the solid crosslinking caused by the sintering preventive which exists on the surfaces of the hematite particles, the effect of washing out the soluble sodium slat, soluble sulfate, etc., and the effect of removing the alkali which adheres to the surfaces of hematite particles in the process of the heat-treatment of the aqueous alkali suspension are taken into consideration, the preferable pH value thereof is in the range of 13.1 to 13.8.

The heat-treating temperature in the aqueous alkali suspension which contains the acicular hematite particles and has a pH value of not less than 13, is usually not less than 80° C., preferably not less than 90° C. If the temperature is less than 80° C., it is difficult to effectively remove the solid crosslinking caused by the sintering preventive which exists on the surfaces of the hematite particles. The upper limit of the heating temperature is preferably 103° C., more preferably 100° C. When the heating temperature exceeds 103° C., although it is possible to effectively remove the solid crosslinking, since an autoclave or the like is necessary or solution boils under a normal pressure, it is not advantageous from the point of view of industry.

The acicular hematite particles heat-treated in the aqueous alkali suspension are, thereafter, filtered out and washed with water by an ordinary method so as to remove the soluble sodium salt and soluble sulfate which are washed out of the interiors and the surfaces of the particles and the alkali such as sodium or the like adhered to the surfaces of the hematite particles in the process of heat-treatment with the aqueous alkali suspension, and then dried.

As the method of washing the particles with water, a method generally industrially used such as a decantation method, a dilution method using a filter thickener and a method of passing water into a filter press is adopted.

If the soluble sodium salt and soluble sulfate which are contained within the high-density hematite particles are washed out with water, even if soluble sodium salt and soluble sulfate adhere to the surfaces when the surfaces of the hematite particles are coated with a coating material in a subsequent step, for example, the later-described coating step, they can be easily removed by water-washing.

Alternatively, the high-density acicular hematite particles coated with the oxide of tin or the oxides of tin and antimony may be produced by the following method. That is, by using acicular goethite particles uncoated with the hydroxide of tin or the hydroxides of tin and antimony but coated with the sintering-preventive agent solely as a starting material, high-density acicular hematite particles uncoated with the hydroxide of tin or the hydroxides of tin and antimony are first produced. The obtained high-density acicular hematite particles are heated in an aqueous alkaline solution, and then filtered and washed with water by ordinary methods. Next, the thus treated high-density acicular hematite particles are coated with the hydroxide of tin or the hydroxides of tin and antimony in the same manner as the above-mentioned coating-treatment of the acicular goethite particles. Thereafter, the high-density acicular hematite particles coated with the hydroxide of tin or the hydroxides of tin and antimony are heated at a temperature of usually not less than 300° C., preferably 350 to 850° C., to convert the hydroxide of tin or the hydroxides of tin and antimony on surfaces of the high-density acicular hematite particles, into the oxide of tin or the oxides of tin and antimony, thereby obtaining the high-density acicular hematite particles coated with the oxide of tin or the oxides of tin and antimony.

The high-density acicular hematite particles coated with the oxide of tin or the oxides of tin and antimony according to the present invention, may be further coated with at least one compound selected from the group consisting of a hydroxide of aluminum, an oxide of aluminum, a hydroxide of silicon and an oxide of silicon, if required.

In the coating-treatment, an aluminum compound, a silicon compound or both the aluminum and silicon compounds are added to a water suspension obtained by dispersing the high-density acicular hematite particles coated with the oxide of tin or the oxides of tin and antimony in an aqueous solution. The suspension is stirred and if required, the pH value of the suspension is adjusted properly to coat at least a part of the surface of the high-density acicular hematite particles with the hydroxide of aluminum, the oxide of aluminum, the hydroxide of silicon or the oxide of silicon. The suspension is then filtered to separate the coated high-density acicular hematite particles therefrom. The coated high-density acicular hematite particles is further washed with water, dried and pulverized. If required, the high-density acicular hematite particles may be subjected to deaeration, compaction or other treatments.

As the aluminum compound for the coating, the same aluminum compounds as those described above as the sintering preventive are usable.

The amount of aluminum compound added is usually 0.01 to 50.00 wt % (calculated as Al) based on the weight of the acicular hematite particles. When the amount is less than 0.01 wt %, the improvement of the dispersibility in the vehicle may be insufficient. On the other hand, if the amount exceeds 50.00 wt %, the coating effect becomes saturated, so that it is meaningless to add an aluminum compound more than necessary.

As the silicon compound, the same silicon compounds as those described above as the sintering preventive are usable.

The amount of silicon compound added is usually 0.01 to 50.00 wt % (calculated as $SiO_2$) based on the weight of the acicular hematite particles. When the amount is less than 0.01 wt %, the improvement of the dispersibility in the vehicle may be insufficient. On the other hand, when the amount exceeds 50.00 wt %, the coating effect becomes saturated, so that it is meaningless to add an silicon compound more than necessary.

When both an aluminum compound and a silicon compound are used, the amount of thereof used is preferably 0.01 to 50.00 wt % (calculated as Al and $SiO_2$) based on the weight of the acicular hematite particles.

It is important in the present invention that when the high-purity and high-density acicular hematite particles in which at least a part of the surface of the particle is coated with an oxide of tin or oxides of tin and antimony, and, which have an average major axial diameter of not more than 0.3 μm, a pH value of not less than 8, and which contain soluble sodium salts of not more than 300 ppm soluble sodium (calculated as Na) and soluble sulfates of not more than 150 ppm soluble sulfate (calculated as $SO_4$), are used as the non-magnetic particles for a non-magnetic undercoat layer, it is possible to enhance the strength and the surface smoothness of the non-magnetic undercoat layer owing to the excellent dispersibility of the high-purity and high-density acicular hematite particles into a binder resin; and that when a magnetic recording medium is formed by using the non-magnetic undercoat layer, it is possible to reduce the light transmittance and the surface resistivity, to enhance the strength and to make the surface of the magnetic recording layer more smooth. Further, it is possible to suppress the deterioration in the magnetic. properties which is caused by the corrosion of the acicular magnetic particles containing iron as a main ingredient dispersed in the magnetic recording layer.

The reason why the strength of the non-magnetic undercoat layer is enhanced and the surface of the non-magnetic undercoat layer is made more smooth, is considered to be as follows. Since it is possible to sufficiently remove the soluble sodium and the soluble sulfate, which agglomerate hematite particles by firmly crosslinking, by washing the particles with water, the agglomerates are separated into substantially discrete particles, so that acicular hematite particles having an excellent dispersion in the vehicle are obtained.

This fact will be explained in the following. The goethite particles as the starting material are produced by various methods, as described above. When as the raw material for producing acicular goethite particles ferrous sulfate is used in any method, a large amount of sulfate [$SO_4^{2-}$] naturally exists in the goethite suspension.

Especially, when goethite particles are produced from an acidic solution, since water-soluble sulfate such as $Na_2SO_4$ is simultaneously produced and an alkali metal such as $K^+$, $NH_4^+$, and $Na^+$ are contained in the goethite suspension, a deposit containing an alkali metal and a sulfate is easily produced. This deposit is represented by $RFe_3(SO_4)(OH)_6$, (R=$K^+$, $NH_4^+$, or $Na^+$). Such a deposit is a slightly soluble sulfuric acid-containing salt and cannot be removed by an ordinary water-washing method. This slightly soluble salt becomes a soluble sodium salt or a soluble sulfate in the next heat-treatment step. The soluble sodium salt and soluble sulfate are firmly combined with the interiors or the surfaces of the acicular hematite particles by a sintering preventive, which is essential for preventing the deformation of the acicular hematite particles and sintering between particles in the heat-treatment at a high temperature for the densification of the particles and which is crosslinking the acicular hematite particles. In this manner, agglomeration between acicular hematite particles becomes further firmer. As a result, the soluble sulfate and the soluble sodium salt, especially, imprisoned in the interiors of the particles or the agglomerates become very difficult to remove by an ordinary water-washing method.

When acicular goethite particles are produced in an aqueous alkali solution by using ferrous sulfate and sodium hydroxide, $Na_2SO_4$ is simultaneously produced as a sulfate and NaOH exists in the goethite suspension. Since they are both soluble, if the acicular goethite particles are adequately washed with water, $Na_2SO_4$ and NaOH ought to be removed. However, since the crystallinity of acicular goethite particles is generally small, the water-washing effect is poor, and when the particles are washed with water by an ordinary method, the particles still contain water-soluble contents such as a soluble sulfate [$SO_4^{2-}$] and a soluble sodium salt [$Na^+$]. The water-soluble contents are firmly combined with the interiors or the surfaces of the acicular hematite particles by the sintering preventive which is crosslinking the particles, as described above, and the agglomeration between acicular hematite particles becomes further firmer. As a result, the soluble sulfate and the soluble sodium salt, especially, imprisoned in the interiors of the particles or the agglomerates become very difficult to remove by an ordinary water-washing method.

It is considered that when the high-density acicular hematite particles in which the soluble sodium salt and the soluble sulfate are firmly combined with the interiors or the surfaces of the particles via the soluble sintering preventive, as described above, are pulverized by a wet-process so as to deagglomerate coarse particles, and heat-treated in the aqueous alkali solution having a pH value of not less than 13 at a temperature of not less than 80° C., the aqueous alkali solution sufficiently permeates into the interiors of the hematite particles, so that the binding strength of the sintering preventive which is firmly combined with the interiors and the surfaces of the particles, and the interiors of the agglomerates is gradually weakened, and the crosslinking is dissociated from the interiors and the surfaces of the particles, and the interiors of the agglomerates, and simultaneously, the water-soluble sodium salt and the water-soluble sulfate are easily removed by water-washing.

It is considered that the deterioration in the magnetic properties which is caused by the corrosion of the acicular magnetic particles containing iron as a main ingredient, which are dispersed in the magnetic recording layer is suppressed because the contents of the soluble sodium salt and the soluble sulfate, which accelerate the corrosion of a metal, in the acicular hematite particles are small and the pH value of the hematite particles themselves is as high as not less than 8.

Actually, it is confirmed that a progress of corrosion of acicular magnetic particles containing iron as a main ingredient was suppressed by a synergistic effect of a small soluble content and a pH value of not less than 8, from the fact that the advantages of the present invention was not attained in any of the cases of (i) heat-treating the hematite particles after wet-pulverization in a slurry with the pH value adjusted to less than 13 at a temperature of not less than 80° C., (ii) heat-treating the hematite particles in a slurry with the pH value adjusted to not less than 13 at a temperature of less than 80° C., or (iii) heat-treating the hematite particles containing coarse particles without being pulverized by a wet-process in a slurry with the pH value adjusted to not less than 13 at a temperature of not less than 80° C., as shown in later-described examples and comparative examples.

By using the high-density acicular hematite particles according to the present invention, a non-magnetic undercoat layer having an excellent surface smoothness and a uniform thickness because of their excellent dispersibility in vehicle, as described above, can be obtained, and a mechanical strength of a substrate when the non-magnetic undercoat layer is formed thereon can be improved. Accordingly, the high-density acicular hematite particles according to the present invention can be suitably used as non-magnetic particles for non-magnetic undercoat layer.

Further, by using the non-magnetic undercoat layer according to the present invention, it becomes possible to form thereon a magnetic recording layer having an excellent surface smoothness and a uniform thickness due to its excellent properties described above. Accordingly, the non-magnetic undercoat layer according to the present invention can be suitably used as a non-magnetic undercoat layer of a magnetic recording medium for high-density recording.

Furthermore, the magnetic recording medium according to the present invention can exhibit a low transmittance and a low surface resistivity, because the high-density acicular hematite particles used therein have an excellent dispersibility in vehicle, and are coated with an oxide of tin or oxides of tin and antimony. In addition, since the high-density acicular hematite particles have a less soluble sodium salt content, a less soluble sulfate content and a pH value of not less than 8, acicular magnetic particles containing iron as a main ingredient , dispersed in a magnetic recording layer of the magnetic recording medium, can be prevented from being corroded, thereby inhibiting the deterioration in magnetic properties of the magnetic recording layer. Accordingly, the magnetic recording medium according to the present invention can maintain its excellent properties for a long period of time.

EXAMPLES

The present invention is described in more detail by Examples and Comparative Examples, but the Examples are only illustrative and, therefore, not intended to limit the scope of this invention.

Various properties of the high-density acicular particles, non-magnetic undercoat layer and magnetic recording medium according to the present invention were evaluated by the following methods.

(1) The residue on sieve after the wet-pulverization was obtained by measuring the concentration of the slurry after pulverization by a wet-process in advance, and determining the quantity of the solid content on the sieve remaining after the slurry equivalent to 100 g of the solid content was passed through the sieve of 325 meshes (mesh size: 44 $\mu$m).

(2) The average major axial diameter and the average minor axial diameter of the particles are expressed by the average values of 350 particles measured in the photograph obtained by magnifying an electron micrograph (×30000) by 4 times in the vertical and horizontal directions, respectively. The aspect ratio is the ratio of the average major axial diameter and the average minor axial diameter.

(3) The geometrical standard deviation ($\sigma$g) of particle size distribution of the major axial diameter was obtained by the following method. The major axial diameters of the particles were measured from the magnified electron microphotograph in the above-mentioned (2). The actual major axial diameters of the particles and the number of particles were obtained from the calculation on the basis of the measured values. On logarithmico-normal probability paper, the major axial diameters were plotted at regular intervals on the abscissa-axis and the accumulative number of particles belonging to each interval of the major axial diameters was plotted by percentage on the ordinate-axis by a statistical technique. The major axial diameters corresponding to the number of particles of 50% and 84.13%, respectively, were read from the graph, and the geometrical standard deviation ($\sigma$g) was measured from the following formula:

Geometrical standard deviation ($\sigma$g)={major axial diameter ($\mu$m) corresponding to 84.13% under integration sieve}/{major axial diameter (geometrical average diameter) corresponding to 50% under integration sieve}.

The smaller the geometrical standard deviation, the more excellent the particle size distribution of the major axial diameters of the particles.

(4) The specific surface area is expressed by the value measured by a BET method.

(5) The decree of denseness of the particles is represented by $S_{BET}/S_{TEM}$ as described above. The $S_{BET}$ is a specific surface area measured by the above-described BET method.

The $S_{TEM}$ is a value calculated from the average major axial diameter d cm and the average minor axial diameter w cm measured from the electron microphotograph described in (2) on the assumption that a particle is a rectangular parallelopiped in accordance with the following formula:

$$S_{TEM}(m^2/g) = \{(4d \cdot w + 2w^2)/(d \cdot w^2 \cdot \rho_p)\} \times 10^{-4}$$

wherein $\rho_p$ is the true specific gravity of the hematite particles, and 5.2 g/cm³ was used.

Since $S_{TEM}$ is a specific surface area of a particle having a smooth surface without any dehydration pore within or on the surface thereof, the closer $S_{BET}/S_{TEM}$ of particles is to 1, it means, the smoother surface the particles have without any dehydration pore within or in the surface thereof, in other words, the particles are high-density particles.

(6) The content of each of Sn, Sb, Al, Co, P and Si was measured from fluorescent X-ray analysis.

(7) The pH value of the particles was measured in the following method. 5 g of the sample was weighed into a 300-ml triangle flask, and 100 ml of pure water was added. The suspension was heated and after keeping the boiled state for 5 minutes, it was corked and left to cool to an ordinary temperature. After adding pure water which was equivalent to the pure water lost by boiling, the flask was corked again, shaken for 1 minute, and left to stand for 5 minutes. The pH value of the supernatant obtained was measured in accordance JIS Z 8802-7.

(8) The contents of soluble sodium salts and soluble sulfates were measured by measuring the Na content and $SO_4^{2-}$-content in the filtrate obtained by filtering the supernatant liquid produced for the measurement of pH value which is described above through filter paper No. 5C, by using an Inductively Coupled Plasma Emission Spectrophotometer (manufactured by Seiko Instruments and Electronics, Ltd.).

(9) The volume resistivity of acicular hematite particles was measured as follows. First, 0.5 g of acicular hematite particles were weighed and pressure-molded under 140 kg/cm² by KBr pellet molding apparatus (manufactured by Simazu Seisakusho Co., Ltd.) to form a cylindrical sample.

Next, the cylindrical sample was allowed to stand at a temperature of 25° C. and a relative humidity (RH) of 60% for not less than 12 hours. The sample was set between stainless steel electrodes, and impressed with a voltage of 15 V using a Wheatstone bridge "TYPE 2768" (manufactured by Yokogawa Hokushin Denki Co., Ltd.) to measure a resistance ($\Omega$) thereof.

Next, the sample was measured for a upper surface area A (cm²) and a thickness t (cm) thereof. A volume resistivity X ($\Omega \cdot$cm) is obtained by the following formula:

$$X(\Omega \cdot cm) = R \times (A/t)$$

wherein R represents an actual measured value of resistance.

(10) The surface resistivity of a coating film was measured as follows. The coating film was first allowed to stand at a temperature of 25° C. and a relative humidity (RH) of 60% for not less than 12 hours. Thereafter, the coating film which was slit into a width of 6 mm, and was disposed between metal electrodes each having a width of 6.5 mm, such that a coating surface of the coating film was contacted with these electrodes. 170 g of weights were respectively fixed to opposite ends of the coating film so as to bring the coating surface of the coating film into close contact with the electrodes. Thereafter, D.C. voltage of 500 V was applied between the metal electrodes to measure a surface resistivity of the coating film by using a resistance meter Model 14329A (manufactured by Yokogawa Hewlett Packard Co., Ltd.).

(11) The viscosity of the coating composition was obtained by measuring the viscosity of the coating composition at 25° C. at a shear rate D of 1.92 sec$^{-1}$ by using an E type viscometer EMD-R (manufactured by Tokyo Keiki, Co., Ltd.).

(12) The gloss of the surface of the coating film of each of the non-magnetic undercoat layer and the magnetic recording layer was measured at an angle of incidence of 45° by a glossmeter UGV-5D (manufactured by Suga Shikenki, Co., Ltd.).

(13) The surface roughness Ra is expressed by the average value of the center-line average roughness of the profile curve of the surface of the coating film by using "Surfcom-575A" (manufactured by Tokyo Seimitsu Co., Ltd.).

(14) The strength of the non-magnetic undercoat layer and magnetic recording medium was expressed the Young's modulus obtained by "Autograph" (produced by Shimazu Seisakusho Ltd.). The Young's modulus was expressed by the ratio of the Young's modulus of the coating film to that of a commercially available video tape "AV T-120" (produce by Victor Company of Japan, Ltd.). The higher the relative value, the more favorable.

(15) The magnetic Properties were measured under an external magnetic field of 10 kOe by "Vibration Sample Magnetometer VSM-3S-15" (manufactured by Toei Kogyo, Co., Ltd.).

(16) The chance in the magnetic properties with Passage of time of a magnetic recording medium caused by the corrosion of the magnetic particles containing iron as a main ingredient was examined as follows.

The magnetic recording medium was allowed to stand in an environment of a temperature of 60° C. and a relative humidity of 90% for 14 days, and the coercive force and the saturation magnetic flux density were measured before and after standing. A change in each characteristic was divided by the value before standing, and represented by percentage as a percentage of change.

(17) The light transmittance of a magnetic recording medium is expressed by the linear adsorption coefficient using a light transmittance at $\lambda = 900$ nm measured by "Photoelectric Spectrophotometer UV-2100" (manufactured by Shimazu Seisakusho, Ltd.). The linear adsorption coefficient is defined by the following formula:

$$\text{Linear adsorption coefficient } (\mu m^{-1}) = \{1n(1/t)\}/FT$$

wherein t represents light transmittance (–) at $\lambda = 900$ nm, and FT represents thickness ($\mu$m) of the coating film composition of the film used for the measurement.

The larger the value, the more difficult it is for the magnetic recording medium to transmit light.

As a blank for measuring the linear adsorption coefficient, the same non-magnetic substrate as that of the above-mentioned magnetic recording medium, was used.

(18) The thickness of each of the non-magnetic substrate, the non-magnetic undercoat layer and the magnetic recording layer constituting the magnetic recording medium was measured in the following manner by using a Digital Electronic Micrometer K351C (manufactured by Anritsu Denki Corp.)

The thickness (A) of a non-magnetic substrate was first measured. Similarly, the thickness (B) (B=the sum of the thicknesses of the non-magnetic substrate and the non-magnetic undercoat layer) of a substrate obtained by forming a non-magnetic undercoat layer on the non-magnetic substrate was measured. Furthermore, the thickness (C) (C=the sum of the thicknesses of the non-magnetic substrate, the non-magnetic undercoat layer and the magnetic recording layer) of a magnetic recording medium obtained by forming a magnetic recording layer on the non-magnetic undercoat layer was measured. The thickness of the non-magnetic undercoat layer is expressed by B−A, and the thickness of the magnetic recording layer is expressed by C−B.

Example 1

Production of Acicular Hematite Particles

Example 1

1,200 g of spindle-shaped goethite particles obtained by the afore-mentioned goethite production method (B) (average major axial diameter: 0.178 μm, average minor axial diameter: 0.0225 μm, aspect ratio: 7.91:1, BET specific surface area: 160.3 m²/g, soluble sodium salt content: 1232 ppm (calculated as Na), soluble sulfate content: 621 ppm (calculated as SO$_4$), pH value: 6.7 and geometrical standard deviation: 1.33) were suspended in a mixed solution of an aqueous ferrous sulfate solution and an aqueous sodium carbonate solution to form a slurry having a solid content of 8 g/liter. After 150 liters of the slurry was heated to 60° C., a 0.1N NaOH aqueous solution was added thereto to adjust the pH value to 9.0.

Next, 2,022 ml of an aqueous solution containing 0.5 mol/liter of sodium stannate was gradually added to the thus obtained alkaline slurry. After completion of the addition, a 0.8N acetic acid solution was added to the slurry to adjust the pH value to 7.5. Thereafter, the slurry was successively filtered, washed with water, dried and pulverized by ordinary methods to obtain spindle-shaped goethite particles whose surfaces were coated with a hydroxide of tin. It was confirmed that the amount of the hydroxide of tin was 9.32% by weight (calculated as Sn) based on the weight of the spindle-shaped goethite particles.

1,000 g of the thus obtained spindle-shaped goethite particles coated with the hydroxide of tin, were charged into a stainless steel rotary furnace, and heat-dehydrated in air at 350° C. for 60 minutes while rotating the furnace, thereby obtaining low-density spindle-shaped hematite particles coated with an oxide of tin. It was determined that the thus obtained low-density spindle-shaped hematite particles had an average major axial diameter of 0.134 μm, an average minor axial diameter of 0.0194 μm, an aspect ratio (average major axial diameter/average minor axial diameter) of 6.91:1, a BET specific surface area ($S_{BET}$) of 168.3 m²/g, a degree of densification ($S_{BET}/S_{TEM}$) of 3.96, a soluble sodium salt content of 1123 ppm (calculated as Na), a soluble sulfate content of 465 ppm (calculated as SO$_4$), a pH value of 6.3, a geometrical standard deviation of 1.34 and a volume resistivity of 1.1×10⁶ Ωcm. Further, the amount of the oxide of tin was 10.60% by weight (calculated as Sn) based on the weight of the spindle-shaped hematite particles.

Next, 900 g of the low-density spindle-shaped hematite particles were charged into a ceramic rotary furnace, and heated in air at 650° C. for 20 minutes while rotating the furnace to seal dehydrating pores of the particles, thereby obtaining high-density spindle-shaped hematite particles coated with the oxide of tin. It was determined that the obtained high-density spindle-shaped hematite particles had an average major axial diameter of 0.129 μm, an average minor axial diameter of 0.0206 μm, an aspect ratio (average major axial diameter/average minor axial diameter) of 6.26:1, a BET specific surface area ($S_{BET}$) of 46.6 m²/g, a degree of high densification ($S_{BET}/S_{TEM}$) of 1.16, a soluble sodium salt content of 2864 ppm (calculated as Na), a soluble sulfate content of 2956 ppm (calculated as SO$_4$), a pH value of 5.4, a geometrical standard deviation of 1.36 and a volume resistivity of 9.6×10⁵ Ωcm. Further, the amount of the oxide of tin was 10.72% by weight (calculated as Sn) based on the weight of the spindle-shaped hematite particles.

After 800 g of the high-density spindle-shaped hematite particles obtained were roughly pulverized by a Nara mill in advance, the obtained particles were charged into 4.7 liters of pure water and peptized by a homomixer (manufactured by Tokushu-kika Kogyo, CO., Ltd.) for 60 minutes.

The slurry of the high-density spindle-shaped hematite particles obtained was then mixed and dispersed for 3 hours at an axial rotation frequency of 2000 rpm while being circulated by a horizontal SGM (Dispermat SL, manufactured by S.C. Adichem, CO., Ltd.). The spindle-shaped hematite particles in the slurry remaining on a sieve of 325 meshes (mesh size: 44 μm) was 0% by weight.

The concentration of the high-density spindle-shaped hematite particles in the slurry was adjusted to 100 g/liter, and a 6N-aqueous NaOH solution was added to 7 liter of the slurry under stirring so as to adjust the pH value to 13.3. The slurry was then heated to 95° C. under stirring, and was held for 3 hours at 95° C.

The slurry was then washed with water by a decantation method and the pH value of the slurry was adjusted to 10.5. When the concentration of the slurry at this point was checked so as to ensure the accuracy, it was 96 g/liter.

2 liter of the slurry washed with water was filtered through a Buchner filter, and pure water was passed until the electric conductivity of the filtrate became not more than 30 μs. The particles were then dried by an ordinary method and pulverized so as to obtain the target high-density spindle-shaped hematite particles. The high-density spindle-shaped hematite particles obtained contained 10.83 wt % of an oxide of tin (calculated as Sn), and had an average major axial diameter of 0.128 μm, a minor axial diameter of 0.0206 μm, an aspect ratio of 6.71:1, a geometric standard deviation σg of particle size (major axial diameter) of 1.35, a BET specific surface ($S_{BET}$) of 47.1 m²/g, a $S_{BET}/S_{TEM}$ value of densification of 1.17 and a pH value of the particles of 8.9. The spindle-shaped hematite particles contained soluble sodium salts of 112 ppm soluble sodium (calculated as Na) and soluble sulfates of 41 ppm soluble sulfate (calculated as SO$_4$). The volume resistivity thereof was 6.3×10⁶ Ωcm.

Example 2

Production of a Non-magnetic Undercoat Layer 12 g of the high-density spindle-shaped hematite particles obtained in the Example 1 were mixed with a binder resin solution (30 wt % of vinyl chloride-vinyl acetate copolymer resin having a sodium sulfonate group and 70 wt % of cyclohexanone) and cyclohexanone, and the mixture (solid content: 72 wt%) obtained was kneaded by a plasto-mill for 30 minutes.

The thus-obtained kneaded material was charged into a 140 ml-glass bottle together with 95 g of 1.5 mmφ glass beads, a binder resin solution (30 wt % of polyurethane resin having a sodium sulfonate group and 70 wt % of a solvent (methyl ethyl ketone:toluene=1:1)), cyclohexanone, methyl ethyl ketone and toluene, and the obtained mixture was mixed and dispersed by a paint shaker for 6 hours to obtain a coating composition.

The thus-obtained coating composition containing high-density spindle-shaped hematite particles was as follows:

| | |
|---|---|
| High-density spindle-shaped hematite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methylethyl ketone | 111.4 parts by weight |
| Toluene | 66.9 parts by weight |

The coating composition obtained containing high-density spindle-shaped hematite particles was applied to a polyethylene terephthalate film of 12 μm thick to a thickness of 55 μm by an applicator, and the film was then dried, thereby forming a non-magnetic undercoat layer. The thickness of the non-magnetic undercoat layer was 3.5 μm.

The gloss of the coating film of the obtained non-magnetic undercoat layer was 201%, the surface roughness Ra was 6.8 nm, and the Young's modulus (relative value) was 128.

Example 3

Production of a Magnetic Recording Layer 12 g of spindle-shaped magnetic particles containing iron as a main ingredient (average major axial diameter: 0.104 μm, average minor axial diameter: 0.0158 μm, aspect ratio: 6.58:1, coercive force: 1905 Oe, saturation magnetization: 138 emu/g, Al content: 4.41 wt %, and Co content: 5.51 wt %), 1.2 g of a polishing agent (AKP-50: trade name, produced by Sumitomo Chemical Co., Ltd.), 0.36 g of carbon black (#3250B, trade name, produced by Mitsubishi Chemical Corp.), a binder resin solution (30 wt % of vinyl chloride-vinyl acetate copolymer resin having a sodium sulfonate group and 70 wt % of cyclohexanone) and cyclohexanone were mixed to obtain a mixture (solid content: 78 wt%). The mixture was further kneaded by a plasto-mill for 30 minutes to obtain a kneaded material.

The thus-obtained kneaded material was charged into a 140 ml-glass bottle together with 95 g of 1.5 mmφ glass beads, a binder resin solution (30 wt % of polyurethane resin having a sodium sulfonate group and 70 wt % of a solvent (methyl ethyl ketone:toluene=1:1)), cyclohexanone, methyl ethyl ketone and toluene, and the mixture was mixed and dispersed by a paint shaker for 6 hours. Thereafter, the lubricant and hardening agent were added to the resultant mixture, and then the obtained mixture was mixed and dispersed by paint shaker for 15 minutes.

The thus-obtained magnetic coating composition was as follows:

| | |
|---|---|
| Magnetic particles containing iron as a main ingredient | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-50) | 10 parts by weight |
| Carbon black (#3250B) | 3.0 parts by weight |
| Lubricant (myristic acid:butyl stearate = 1:2) | 3.0 parts by weight |
| Hardening agent (polyisocyanate) | 5.0 parts by weight |

-continued

| | |
|---|---|
| Cyclohexanone | 65.8 parts by weight |
| Methyl ethyl ketone | 164.5 parts by weight |
| Toluene | 98.7 parts by weight |

The magnetic coating composition obtained was applied to the non-magnetic undercoat layer to a thickness of 15 μm by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the magnetic recording layer was 1.1 μm.

The magnetic tape obtained had a coercive force of 1986 Oe, a squareness (Br/Bm) of 0.87, a gloss of 228%, a surface roughness Ra of 6.4 nm, a Young's modulus (relative value) of 133, a linear absorption coefficient of 1.21, a surface resistivity of $1.1 \times 10^7$ ω/sq. The changes in the coercive force and the saturation magnetic flux density Bm with passage of time were 6.4%, and 5.4%, respectively.

Examples 4 to 21, Comparative Examples 1 to 14

Types of Acicular Goethite Particles

The starting materials A to F shown in Table 1 were used as the starting materials for producing acicular hematite particles.

Production of Low-density Acicular Hematite Particles

Low-density acicular hematite particles were obtained in the same way as in Example 1 except for varying the kind of acicular goethite particles as the starting materials, the kind and amount of tin compound, the kind and amount of antimony compound, the kind and amount of sintering preventive, and heat-dehydrating temperature and time.

The main producing conditions and various properties are shown in Tables 2 to 3.

Examples 22 to 39, Comparative Examples 15 to 27

Production of High-density Acicular Hematite Particles

High-density acicular hematite particles were obtained in the same way as in Example 1 except for varying the kind of low-density hematite particles, and the heating temperature and time for densification.

The main producing conditions and various properties are shown in Tables 4 and 5.

Examples 40 to 57, Comparative Examples 28 to 35

Treatment of Acicular Hematite Particles in an Aqueous Alkali Solution

High-purity, high-density acicular hematite particles were obtained in the same way as in Example 1 except for varying the kind of high-density acicular hematite particles, whether or not the wet-pulverization process was conduced, whether or not the heat-treatment in the aqueous alkali solution was conducted, the pH value of the slurry, and the heating time and temperature.

The main producing conditions and various properties are shown in Tables 6 to 9.

Example 58

Surface Coating of Acicular Hematite Particles

The concentration of the slurry having a pH value 10.5 which was obtained in Example 40 by washing the particles in an aqueous alkali solution after heat-treatment with water by a decantation method was 96 g/liter. 5 liter of the slurry was re-heated to 60° C., and 231 ml (equivalent to 1.3 wt % (calculated as Al) based on the acicular hematite particles) of a 1.0-N $NaAlO_2$ solution was added to the slurry, and the mixture was held for 60 minutes. Thereafter, the pH value of the mixture was adjusted to 8.2 by using acetic acid. The particles were then filtered out, washed with water, dried and pulverized in the same way as in Example 1, thereby obtaining acicular hematite particles coated with a coating material.

The main producing conditions and various properties are shown in Tables 10 and 11.

Examples 59 to 72

Acicular hematite particles coated with a coating material were obtained in the same way as in Example 58 except for varying the kind of acicular hematite particles, and the kind and the amount of surface treating material.

The main producing conditions and various properties are shown in Table 10 and 11.

Example 73

Coating-treatment of High-density Acicular Hematite Particles Treated with Alkaline Aqueous Solution, with Oxide of Tin or Oxides of Tin and Antimony The slurry obtained in Example 55 by washing with water by a decantation method after the heat-treatment in alkaline aqueous solution, had a pH value of 10.5 and a concentration of 96 g/liter. After 5 liters of the slurry was heated again to 60° C., 121 ml of a 1.0-mol sodium stannate solution (corresponding to 3.0% by weight (calculated as Sn) based on the weight of the acicular hematite particles) was added thereto. After the slurry was allowed to stand for 60 minutes, the pH value thereof was adjusted to 8.0 by adding acetic acid thereto. Next, the slurry was filtered to separate a solid component therefrom, and then the solid component was washed with water, dried and pulverized in the same manner as in Example 1, thereby obtaining high-density acicular hematite particles coated with a hydroxide of tin.

The essential production conditions and properties of the obtained high-density acicular hematite particles are shown in Tables 10 and 11.

Examples 74 and 75

The same procedure as defined in Example 73 was conducted except that kind of acicular hematite particles treated with alkaline aqueous solution, kind and amount of tin compound, kind, amount and use or non-use of antimony compound and treating temperature and treating time used for the heat-treatment were varied, thereby obtaining high-density acicular hematite particles coated with a hydroxide of tin or hydroxides of tin and antimony.

The essential production conditions and properties of the obtained high-density acicular hematite particles are shown in Tables 10 and 11.

Example 76

The high-density acicular hematite particles coated with the hydroxide of tin which were obtained in Example 73, were charged into a stainless steel rotary furnace, and heated in air at 400° C. for 60 minutes while rotating the furnace, thereby obtaining high-density acicular hematite particles coated with an oxide of tin.

The essential production conditions and properties of the obtained high-density acicular hematite particles are shown in Tables 12 and 13.

Examples 77 and 78

The same procedure as defined in Example 76 was conducted except that kind of high-density acicular hematite particles coated with a hydroxide of tin or hydroxides of tin and antimony and treating temperature and treating time used for the heat-treatment were varied, thereby obtaining high-density acicular hematite particles coated with an oxide of tin or oxides of tin and antimony.

The essential production conditions and properties of the obtained high-density acicular hematite particles are shown in Tables 12 and 13.

Examples 79 to 111, Comparative Examples 36 to 50

Production of a Non-magnetic Undercoat Layer

A non-magnetic undercoat layer was obtained in the same way as in Example 2 by using the acicular hematite particles obtained in Examples 40 to 54, 58 to 72 and 76 to 78, Comparative Examples 1, 3, 15 to 18, 23 and 28 to 35.

The main producing conditions and various properties are shown in Tables 14 to 16.

Examples 112 to 144, Comparative Examples 51 to 65

Production of a Magnetic Recording Medium Using Magnetic Particles Containing Iron as a Main Ingredient A magnetic recording medium using acicular magnetic particles containing iron as a main ingredient was obtained in the same way as in Example 3 except for varying the kind of non-magnetic undercoat layer obtained in Examples 79 to 111 and Comparative Examples 36 to 50 and the kind of acicular magnetic particles containing iron as a main ingredient.

The main producing conditions and various properties are shown in Tables 17 to 19.

TABLE 1

| Kind of starting material | Acicular Goethite particles | | |
|---|---|---|---|
| | Production method | Average major axial diameter ($\mu$m) | Average minor axial diameter ($\mu$m) |
| Starting material A | BB | 0.181 | 0.0246 |
| Starting material B | BB | 0.220 | 0.0283 |
| Starting material C | DD | 0.245 | 0.0305 |
| Starting material D | CC | 0.164 | 0.0218 |

TABLE 1-continued

| | | | |
|---|---|---|---|
| Starting material E | AA | 0.260 | 0.0298 |
| Starting material F | BB | 0.234 | 0.0288 |

Acicular Goethite particles

| Kind of starting material | Aspect ratio* (−) | Geometrical standard deviation σg (−) | BET specific surface area (m²/g) |
|---|---|---|---|
| Starting material A | 7.36 | 1.37 | 151.0 |
| Starting material B | 7.77 | 1.34 | 125.0 |
| Starting material C | 8.03 | 1.31 | 95.1 |
| Starting material D | 7.52 | 1.37 | 186.5 |
| Starting material E | 8.72 | 1.44 | 72.6 |
| Starting material F | 8.13 | 1.31 | 110.5 |

Acicular Goethite particles

| Kind of starting material | Soluble sodium salt (ppm) | Soluble sulfate (ppm) | pH value (−) |
|---|---|---|---|
| Starting material A | 412 | 386 | 6.8 |
| Starting material B | 512 | 264 | 7.2 |
| Starting material C | 1215 | 2150 | 5.1 |
| Starting material D | 415 | 915 | 5.5 |
| Starting material E | 1565 | 171 | 8.3 |
| Starting material F | 436 | 312 | 6.9 |

(Note) *Aspect ratio = average major axial diameter/average minor axial diameter
(Note) PRODUCTION METHOD:
AA: A method of oxidizing a suspension having a pH value of not less than 11 and containing colloidal ferrous hydroxide particles which is obtained by adding not less than an equivalent of an alkali hydroxide solution to an aqueous ferrous salt solution, by passing an oxygen-containing gas thereinto at a temperature of not higher than 80° C.
BB: A method of producing acicular goethite particles by oxidizing a suspension containing FeCO₃ which is obtained by reacting an aqueous ferrous salt solution with an aqueous alkali carbonate solution, by passing an oxygen-containing gas thereinto after aging the suspension, if necessary.
CC: A method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, adding not less than an equivalent of an alkali hydroxide solution to the $Fe^{2+}$ in the aqueous ferrous salt solution, to the aqueous ferrous salt solution containing the acicular goethite seed particles, and passing an oxygen-containing gas into the aqueous ferrous salt solution.
DD: A method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, and growing the obtained acicular seed goethite particles in an acidic or neutral region.

TABLE 2

| Examples | Kind of acicular goethite particles as the starting material | Sintering preventive Kind | Calculated as | Amount added (wt. %) |
|---|---|---|---|---|
| Example 4 | Particles of Example 1 | Sodium stannate | Sn | 15.0 |
| Example 5 | Starting material A | Stannous chloride | Sn | 20.0 |
| Example 6 | Starting material A | Sodium stannate | Sn | 50.0 |
| | | #3 Water glass | SiO₂ | 1.0 |
| Example 7 | Starting material B | Sodium stannate | Sn | 1.2 |
| Example 8 | Starting material B | Sodium stannate | Sn | 3.0 |
| Example 9 | Starting material C | Stannous chloride | Sn | 10.0 |
| Example 10 | Starting material C | Sodium stannate | Sn | 50.0 |
| Example 11 | Starting material D | Sodium stannate | Sn | 200.0 |
| Example 12 | Starting material D | Sodium stannate | Sn | 500.0 |
| Example 13 | Starting material E | Stannous chloride | Sn | 100.0 |
| Example 14 | Starting material E | Sodium stannate | Sn | 75.0 |
| | | Phosphoric acid | P | 0.5 |
| Example 15 | Starting material F | Sodium stannate | Sn | 50.0 |
| | | Antimony chloride | Sb | 5.0 |
| Example 16 | Starting material F | Sodium stannate | Sn | 10.0 |
| | | Antimony acetate | Sb | 2.0 |
| Example 17 | Particles of Example 1 | Sodium stannate | Sn | 100.0 |
| | | Antimony sol | Sb | 10.0 |
| | | #3 Water glass | SiO₂ | 1.5 |
| Example 18 | Particles of Example 1 | Stannous chloride | Sn | 300.0 |
| | | Antimony chloride | Sb | 15.0 |
| | | Aluminum sulfate | Al | 1.0 |
| Example 19 | Starting material A | Sodium hexametaphosphate | P | 1.5 |
| Example 20 | Starting material A | #3 Water glass | SiO₂ | 2.0 |
| Example 21 | Starting material A | Phosphoric acid | P | 0.5 |
| | | #3 Water glass | SiO₂ | 0.75 |

| | Heat treatment for low densification | | Low-density acicular hematite particles | |
|---|---|---|---|---|
| Examples | Temperature (° C.) | Time (min) | Average major axial diameter (μm) | Average minor axial diameter (μm) |
| Example 4 | 300 | 90 | 0.138 | 0.0199 |
| Example 5 | 350 | 30 | 0.143 | 0.0214 |
| Example 6 | 330 | 120 | 0.140 | 0.0221 |
| Example 7 | 280 | 30 | 0.180 | 0.0261 |
| Example 8 | 300 | 60 | 0.183 | 0.0260 |
| Example 9 | 330 | 120 | 0.200 | 0.0277 |
| Example 10 | 350 | 90 | 0.206 | 0.0290 |
| Example 11 | 380 | 60 | 0.138 | 0.0211 |
| Example 12 | 400 | 30 | 0.140 | 0.0240 |
| Example 13 | 380 | 60 | 0.218 | 0.0283 |
| Example 14 | 380 | 90 | 0.213 | 0.0276 |
| Example 15 | 350 | 60 | 0.191 | 0.0277 |
| Example 16 | 375 | 60 | 0.192 | 0.0278 |
| Example 17 | 310 | 240 | 0.142 | 0.0205 |
| Example 18 | 350 | 180 | 0.145 | 0.0211 |
| Example 19 | 330 | 60 | 0.141 | 0.0213 |
| Example 20 | 310 | 90 | 0.141 | 0.0210 |
| Example 21 | 350 | 120 | 0.144 | 0.0278 |

| | Low-density acicular hematite particles | | | |
|---|---|---|---|---|
| Examples | Geometrical standard deviation σg (−) | Aspect ratio* (−) | $S_{BET}$ (m²/g) | $S_{TEM}$ (m²/g) |
| Example 4 | 1.33 | 6.93 | 169.1 | 41.4 |
| Example 5 | 1.37 | 6.68 | 168.5 | 38.6 |
| Example 6 | 1.38 | 6.33 | 160.8 | 37.6 |
| Example 7 | 1.34 | 6.90 | 144.0 | 31.6 |
| Example 8 | 1.34 | 7.04 | 135.9 | 31.7 |
| Example 9 | 1.33 | 7.22 | 119.0 | 29.7 |
| Example 10 | 1.32 | 7.10 | 125.1 | 28.4 |

TABLE 2-continued

| Examples | | | | |
|---|---|---|---|---|
| Example 11 | 1.37 | 6.54 | 197.5 | 39.2 |
| Example 12 | 1.40 | 5.83 | 213.5 | 34.8 |
| Example 13 | 1.44 | 7.70 | 110.8 | 28.9 |
| Example 14 | 1.44 | 7.72 | 103.6 | 29.7 |
| Example 15 | 1.32 | 6.90 | 146.9 | 29.8 |
| Example 16 | 1.32 | 6.91 | 138.5 | 29.7 |
| Example 17 | 1.34 | 6.93 | 173.8 | 40.2 |
| Example 18 | 1.34 | 6.87 | 180.6 | 39.1 |
| Example 19 | 1.36 | 6.62 | 171.6 | 38.8 |
| Example 20 | 1.36 | 6.71 | 178.8 | 39.4 |
| Example 21 | 1.36 | 6.92 | 186.2 | 39.7 |

| | Low-density acicular hematite particles | | | |
|---|---|---|---|---|
| Examples | $S_{BET}/S_{TEM}$ (-) | Soluble sodium salt (ppm) | Soluble sulfate (ppm) | pH value (-) |
| Example 4 | 4.08 | 1263 | 680 | 7.8 |
| Example 5 | 4.36 | 1897 | 879 | 7.1 |
| Example 6 | 4.28 | 1835 | 980 | 8.1 |
| Example 7 | 4.56 | 870 | 789 | 6.5 |
| Example 8 | 4.29 | 1123 | 987 | 6.8 |
| Example 9 | 4.01 | 2356 | 1234 | 6.3 |
| Example 10 | 4.41 | 2987 | 1145 | 6.8 |
| Example 11 | 5.03 | 3456 | 789 | 7.9 |
| Example 12 | 6.14 | 4890 | 891 | 8.0 |
| Example 13 | 3.83 | 2156 | 1348 | 6.5 |
| Example 14 | 3.49 | 1768 | 1123 | 7.5 |
| Example 15 | 4.93 | 1345 | 888 | 6.0 |
| Example 16 | 4.67 | 1879 | 1334 | 6.1 |
| Example 17 | 4.32 | 2350 | 1345 | 8.1 |
| Example 18 | 4.62 | 2879 | 789 | 7.3 |
| Example 19 | 4.42 | 2006 | 912 | 7.5 |
| Example 20 | 4.54 | 2128 | 986 | 7.3 |
| Example 21 | 4.70 | 2166 | 982 | 7.3 |

(Note) *Aspect ratio average major axial diameter/average minor axial diameter

TABLE 3

| Comparative Examples | Kind of acicular goethite particles as the starting particles | Sintering preventive | | |
|---|---|---|---|---|
| | | Kind | Calculated as | Amount added (wt. %) |
| Comparative Example 1 | Particles of Example 1 | — | — | — |
| Comparative Example 2 | Particles of Example 1 | — | — | — |
| Comparative Example 3 | Particles of Example 1 | #3 Water glass | $SiO_2$ | 0.50 |
| Comparative Example 4 | Particles of Example 1 | Phosphoric acid | P | 0.50 |
| Comparative Example 5 | Particles of Example 1 | #3 Water glass | $SiO_2$ | 1.00 |
| Comparative Example 6 | Particles of Example 1 | Sodium hexametaphosphate | P | 0.50 |
| Comparative Example 7 | Particles of Example 1 | #3 Water glass | $SiO_2$ | 1.50 |
| Comparative Example 8 | Particles of Example 1 | #3 Water glass | $SiO_2$ | 0.20 |
| Comparative Example 9 | Particles of Example 1 | Phosphoric acid | P | 0.75 |
| Comparative Example 10 | Starting material F | Sodium hexametaphosphate | P | 2.00 |
| Comparative Example 11 | Starting material F | #3 Water glass | $SiO_2$ | 1.25 |
| Comparative Example 12 | Starting material F | Phosphoric acid | P | 1.50 |
| Comparative Example 13 | Starting material F | Colloidal silica | $SiO_2$ | 0.25 |
| Comparative Example 14 | Starting material F | Sodium stannate | Sn | 0.05 |

TABLE 3-continued

| Comparative Examples | Heat treatment for low densification | | Low-density acicular hematite particles | |
|---|---|---|---|---|
| | Temperature (°C.) | Time (min) | Average major axial diameter (μm) | Average minor axial diameter (μm) |
| Comparative Example 1 | 350 | 90 | 0.135 | 0.0199 |
| Comparative Example 2 | 380 | 45 | 0.132 | 0.0206 |
| Comparative Example 3 | 340 | 75 | 0.136 | 0.0197 |
| Comparative Example 4 | — | — | — | — |
| Comparative Example 5 | 350 | 60 | 0.134 | 0.0199 |
| Comparative Example 6 | 350 | 30 | 0.132 | 0.0197 |
| Comparative Example 7 | 330 | 90 | 0.134 | 0.0197 |
| Comparative Example 8 | 300 | 60 | 0.132 | 0.0190 |
| Comparative Example 9 | 380 | 20 | 0.132 | 0.0195 |
| Comparative Example 10 | 380 | 90 | 0.193 | 0.0276 |
| Comparative Example 11 | 350 | 90 | 0.193 | 0.0280 |
| Comparative Example 12 | 330 | 30 | 0.192 | 0.0278 |
| Comparative Example 13 | 325 | 45 | 0.189 | 0.0288 |
| Comparative Example 14 | 300 | 60 | 0.185 | 0.0293 |

| Comparative Examples | Low-density acicular hematite particles | | | |
|---|---|---|---|---|
| | Geometrical standard deviation σg (-) | Aspect ratio* (-) | $S_{BET}$ (m²/g) | $S_{TEM}$ (m²/g) |
| Comparative Example 1 | 1.33 | 6.78 | 171.6 | 41.5 |
| Comparative Example 2 | 1.34 | 6.41 | 135.8 | 40.3 |
| Comparative Example 3 | 1.33 | 6.90 | 165.8 | 41.9 |
| Comparative Example 4 | — | — | — | — |
| Comparative Example 5 | 1.34 | 6.73 | 134.8 | 41.5 |
| Comparative Example 6 | 1.35 | 6.70 | 125.9 | 42.0 |
| Comparative Example 7 | 1.35 | 6.80 | 145.0 | 41.9 |
| Comparative Example 8 | 1.35 | 6.95 | 145.9 | 43.4 |
| Comparative Example 9 | 1.36 | 6.77 | 156.9 | 42.4 |
| Comparative Example 10 | 1.33 | 6.99 | 124.3 | 29.9 |
| Comparative Example 11 | 1.33 | 6.89 | 131.2 | 29.5 |
| Comparative Example 12 | 1.32 | 6.91 | 138.2 | 29.7 |
| Comparative Example 13 | 1.33 | 6.56 | 136.3 | 28.7 |
| Comparative Example 14 | 1.32 | 6.31 | 126.4 | 28.3 |

TABLE 3-continued

| | Low-density acicular hematite particles | | | | |
|---|---|---|---|---|---|
| Comparative Examples | $S_{BET}/S_{TEM}$ (-) | Soluble sodium salt (ppm) | Soluble sulfate (ppm) | pH value (-) | Volume resistivity (Ωcm) |
| Comparative Example 1 | 4.13 | 852 | 568 | 6.0 | $1.2 \times 10^8$ |
| Comparative Example 2 | 3.37 | 903 | 498 | 6.5 | — |
| Comparative Example 3 | 3.96 | 1245 | 423 | 6.8 | $4.0 \times 10^8$ |
| Comparative Example 4 | — | — | — | — | — |
| Comparative Example 5 | 3.25 | 1235 | 568 | 6.7 | — |
| Comparative Example 6 | 3.00 | 1025 | 612 | 6.6 | — |
| Comparative Example 7 | 3.46 | 1365 | 682 | 7.1 | — |
| Comparative Example 8 | 3.36 | 1265 | 591 | 7.2 | — |
| Comparative Example 9 | 3.70 | 1124 | 654 | 7.1 | — |
| Comparative Example 10 | 4.16 | 1026 | 689 | 6.9 | — |
| Comparative Example 11 | 4.45 | 1176 | 563 | 7.1 | — |
| Comparative Example 12 | 4.66 | 1015 | 597 | 7.0 | — |
| Comparative Example 13 | 4.74 | 892 | 498 | 6.2 | — |
| Comparative Example 14 | 4.46 | 1235 | 569 | 7.3 | — |

(Note)
*Aspect ratio = average major axial diameter/average minor axial diameter

TABLE 4

| | | Heat treatment for high densification | | High-density acicular hematite particles | |
|---|---|---|---|---|---|
| Examples | Kind of low-density acicular hematite particles | Temperature (° C.) | Time (min) | Average major axial diameter (μm) | Average minor axial diameter (μm) |
| Example 22 | Example 4 | 700 | 60 | 0.132 | 0.0210 |
| Example 23 | Example 5 | 730 | 60 | 0.138 | 0.0223 |
| Example 24 | Example 6 | 750 | 60 | 0.138 | 0.0230 |
| Example 25 | Example 7 | 600 | 15 | 0.169 | 0.0301 |
| Example 26 | Example 8 | 610 | 15 | 0.173 | 0.0288 |
| Example 27 | Example 9 | 650 | 30 | 0.186 | 0.0294 |
| Example 28 | Example 10 | 730 | 90 | 0.204 | 0.0315 |
| Example 29 | Example 11 | 750 | 120 | 0.137 | 0.0222 |
| Example 30 | Example 12 | 800 | 30 | 0.139 | 0.0243 |
| Example 31 | Example 13 | 750 | 30 | 0.211 | 0.0299 |
| Example 32 | Example 14 | 750 | 60 | 0.208 | 0.0296 |
| Example 33 | Example 15 | 730 | 60 | 0.189 | 0.0285 |
| Example 34 | Example 16 | 710 | 45 | 0.189 | 0.0298 |
| Example 35 | Example 17 | 750 | 30 | 0.139 | 0.0220 |
| Example 36 | Example 18 | 780 | 60 | 0.140 | 0.0219 |
| Example 37 | Example 19 | 680 | 60 | 0.141 | 0.0213 |
| Example 38 | Example 20 | 700 | 30 | 0.140 | 0.0211 |
| Example 39 | Example 21 | 700 | 60 | 0.142 | 0.0210 |

| | High-density acicular hematite particles | | | | |
|---|---|---|---|---|---|
| Examples | Geometrical standard deviation σg (-) | Aspect ratio* (-) | $S_{BET}$ (m²/g) | $S_{TEM}$ (m²/g) | $S_{BET}/S_{TEM}$ (-) |
| Example 22 | 1.35 | 6.29 | 51.3 | 39.5 | 1.30 |
| Example 23 | 1.38 | 6.19 | 46.8 | 37.3 | 1.26 |
| Example 24 | 1.38 | 6.00 | 44.9 | 36.2 | 1.24 |
| Example 25 | 1.35 | 5.61 | 38.5 | 27.8 | 1.38 |
| Example 26 | 1.35 | 6.01 | 35.1 | 28.9 | 1.21 |
| Example 27 | 1.35 | 6.33 | 33.7 | 28.2 | 1.19 |
| Example 28 | 1.34 | 6.48 | 34.9 | 26.3 | 1.33 |
| Example 29 | 1.39 | 6.17 | 51.0 | 37.5 | 1.36 |
| Example 30 | 1.41 | 5.72 | 53.2 | 34.4 | 1.55 |

TABLE 4-continued

| | | | | | |
|---|---|---|---|---|---|
| Example 31 | 1.44 | 7.06 | 37.5 | 27.5 | 1.36 |
| Example 32 | 1.45 | 7.03 | 38.9 | 27.8 | 1.40 |
| Example 33 | 1.33 | 6.63 | 40.1 | 29.0 | 1.38 |
| Example 34 | 1.34 | 6.34 | 37.5 | 27.8 | 1.35 |
| Example 35 | 1.36 | 6.32 | 55.9 | 37.7 | 1.48 |
| Example 36 | 1.35 | 6.39 | 57.1 | 37.9 | 1.51 |
| Example 37 | 1.36 | 6.62 | 51.2 | 38.8 | 1.32 |
| Example 38 | 1.36 | 6.64 | 50.6 | 39.2 | 1.29 |
| Example 39 | 1.36 | 6.76 | 51.6 | 39.3 | 1.31 |

| | High-density acicular hematite particles Kind of Sintering preventive | | | | | |
|---|---|---|---|---|---|---|
| Examples | Calculated as | Amount (wt. %) | Calculated as | Amount (wt. %) | Calculated as | Amount (wt. %) |
| Example 22 | Sn | 14.33 | — | — | — | — |
| Example 23 | Sn | 18.06 | — | — | — | — |
| Example 24 | Sn | 36.83 | — | — | $SiO_2$ | 0.62 |
| Example 25 | Sn | 1.30 | — | — | — | — |
| Example 26 | Sn | 3.16 | — | — | — | — |
| Example 27 | Sn | 10.06 | — | — | — | — |
| Example 28 | Sn | 35.81 | — | — | — | — |
| Example 29 | Sn | 73.31 | — | — | — | — |
| Example 30 | Sn | 91.68 | — | — | — | — |
| Example 31 | Sn | 55.68 | — | — | — | — |
| Example 32 | Sn | 47.15 | P | 0.48 | — | — |
| Example 33 | Sn | 37.13 | Sb | 5.14 | — | — |
| Example 34 | Sn | 9.65 | Sb | 2.01 | — | — |
| Example 35 | Sn | 49.30 | Sb | 8.88 | $SiO_2$ | 1.41 |
| Example 36 | Sn | 80.61 | Sb | 14.31 | Al | 0.96 |
| Example 37 | — | — | P | 1.36 | — | — |
| Example 38 | — | — | — | — | $SiO_2$ | 1.83 |
| Example 39 | — | — | P | 0.51 | $SiO_2$ | 0.70 |

| | High-density acicular hematite particles | | |
|---|---|---|---|
| Examples | Soluble sodium salt (ppm) | Soluble sulfate (ppm) | pH value (—) |
| Example 22 | 1894 | 3400 | 5.1 |
| Example 23 | 2561 | 3604 | 4.6 |
| Example 24 | 2569 | 3448 | 5.7 |
| Example 25 | 1205 | 3698 | 5.6 |
| Example 26 | 1640 | 3948 | 5.2 |
| Example 27 | 3063 | 3702 | 4.7 |
| Example 28 | 3764 | 3591 | 5.8 |
| Example 29 | 4182 | 3077 | 6.5 |
| Example 30 | 5477 | 3475 | 6.8 |
| Example 31 | 2911 | 4044 | 4.1 |
| Example 32 | 2581 | 3931 | 4.5 |
| Example 33 | 2219 | 2664 | 5.0 |
| Example 34 | 2743 | 4669 | 4.1 |
| Example 35 | 3485 | 2356 | 7.8 |
| Example 36 | 3023 | 2768 | 6.8 |
| Example 37 | 2682 | 3162 | 5.5 |
| Example 38 | 2766 | 3082 | 5.8 |
| Example 39 | 2826 | 3365 | 5.5 |

(Note) *Aspect ratio = average major axial diameter/average minor axial diameter

TABLE 5

| Comparative Examples | Kind of low-density acicular hematite particles or acicular goethite particles | Heat treatment for high densification | | High-density acicular hematite particles | |
|---|---|---|---|---|---|
| | | Temperature (° C.) | Time (min) | Average major axial diameter (μm) | Average minor axial diameter (μm) |
| Comparative Example 15 | Example 1 | 720 | 15 | 0.075 | 0.0336 |
| Comparative Example 16 | Comparative Example 2 | 680 | 15 | 0.098 | 0.0286 |

TABLE 5-continued

| Comparative Example | Comparative Example | | | | |
|---|---|---|---|---|---|
| Comparative Example 17 | Comparative Example 4 | 700 | 30 | 0.125 | 0.0248 |
| Comparative Example 18 | Comparative Example 5 | 750 | 60 | 0.131 | 0.0220 |
| Comparative Example 19 | Comparative Example 6 | 570 | 90 | 0.134 | 0.0206 |
| Comparative Example 20 | Comparative Example 7 | 720 | 45 | 0.134 | 0.0201 |
| Comparative Example 21 | Comparative Example 8 | 730 | 30 | 0.132 | 0.0218 |
| Comparative Example 22 | Comparative Example 9 | 520 | 90 | 0.132 | 0.0198 |
| Comparative Example 23 | Comparative Example 10 | 720 | 15 | 0.191 | 0.0294 |
| Comparative Example 24 | Comparative Example 11 | 650 | 40 | 0.192 | 0.0288 |
| Comparative Example 25 | Comparative Example 12 | 600 | 15 | 0.192 | 0.0290 |
| Comparative Example 26 | Comparative Example 13 | 750 | 20 | 0.190 | 0.0300 |
| Comparative Example 27 | Comparative Example 14 | 460 | 60 | 0.185 | 0.0292 |

| | High-density acicular hematite particles | | | | |
|---|---|---|---|---|---|
| Comparative Examples | Geometrical standard deviation $\sigma_g$ (−) | Aspect ratio* (−) | $S_{BET}$ ($m^2/g$) | $S_{TEM}$ ($m^2/g$) | $S_{BET}/S_{TEM}$ (−) |
| Comparative Example 15 | 1.84 | 2.23 | 15.8 | 28.0 | 0.56 |
| Comparative Example 16 | 1.71 | 3.43 | 21.9 | 30.8 | 0.71 |
| Comparative Example 17 | 1.56 | 5.04 | 31.8 | 34.1 | 0.93 |
| Comparative Example 18 | 1.36 | 5.95 | 45.6 | 37.9 | 1.20 |
| Comparative Example 19 | 1.35 | 6.50 | 59.3 | 40.2 | 1.47 |
| Comparative Example 20 | 1.35 | 6.67 | 52.6 | 41.1 | 1.28 |
| Comparative Example 21 | 1.36 | 6.06 | 43.6 | 38.2 | 1.14 |
| Comparative Example 22 | 1.34 | 6.67 | 68.9 | 41.8 | 1.65 |
| Comparative Example 23 | 1.34 | 6.50 | 35.2 | 28.2 | 1.25 |
| Comparative Example 24 | 1.33 | 6.67 | 43.9 | 28.7 | 1.53 |
| Comparative Example 25 | 1.33 | 6.62 | 51.5 | 28.5 | 1.81 |
| Comparative Example 26 | 1.34 | 6.33 | 37.5 | 27.7 | 1.36 |
| Comparative Example 27 | 1.33 | 6.34 | 65.0 | 28.4 | 2.29 |

| | High-density acicular hematite particles | | | | | |
|---|---|---|---|---|---|---|
| | Kind of Sintering preventive | | Soluble | Soluble | Volume | |
| Comparative Example | Calculated as | Amount (wt. %) | sodium salt (ppm) | sulfate (ppm) | pH value (−) | resistivity ($\Omega m$) |
| Comparative Example 15 | — | — | 1658 | 3256 | 5.3 | $5.6 \times 10^8$ |
| Comparative Example 16 | — | — | 1745 | 3569 | 5.3 | $8.9 \times 10^8$ |
| Comparative Example 17 | P | 0.44 | 1652 | 3756 | 5.1 | $3.8 \times 10^8$ |
| Comparative Example 18 | $SiO_2$ | 0.93 | 1548 | 3874 | 4.9 | $7.1 \times 10^8$ |
| Comparative Example 19 | P | 0.46 | 1436 | 2964 | 5.3 | — |
| Comparative Example 20 | $SiO_2$ | 1.40 | 1569 | 3684 | 5.1 | — |
| Comparative Example 21 | $SiO_2$ | 0.21 | 1856 | 3548 | 5.2 | — |

TABLE 5-continued

| | | | | | | |
|---|---|---|---|---|---|---|
| Comparative Example 22 | P | 0.74 | 1329 | 2456 | 5.6 | — |
| Comparative Example 23 | P | 1.83 | 1954 | 3659 | 5.0 | $3.8 \times 10^8$ |
| Comparative Example 24 | $SiO_2$ | 1.22 | 2045 | 3246 | 5.6 | — |
| Comparative Example 25 | P | 1.46 | 1564 | 2857 | 5.2 | — |
| Comparative Example 26 | $SiO_2$ | 0.23 | 1186 | 3156 | 4.7 | — |
| Comparative Example 27 | Sn | 0.05 | 2356 | 3247 | 5.6 | — |

(Note) *Aspect ratio = average major axial diameter/average minor axial diameter

TABLE 6

| Examples | Kind of high-density acicular hematite particles | Wet-pulverization step Use or non-use | Wet-pulverization step Residue on sieve (wt. %) | Heat treatment in aqueous alkaline solution pH (-) | Heat treatment in aqueous alkaline solution Temperature (° C.) | Heat treatment in aqueous alkaline solution Time (min) |
|---|---|---|---|---|---|---|
| Example 40 | Example 22 | used | 0 | 13.1 | 98 | 180 |
| Example 41 | Example 23 | used | 0 | 13.5 | 94 | 180 |
| Example 42 | Example 24 | used | 0 | 13.3 | 95 | 180 |
| Example 43 | Example 25 | used | 0 | 13.8 | 91 | 120 |
| Example 44 | Example 26 | used | 0 | 13.8 | 95 | 90 |
| Example 45 | Example 27 | used | 0 | 13.5 | 95 | 90 |
| Example 46 | Example 28 | used | 0 | 13.6 | 95 | 180 |
| Example 47 | Example 29 | used | 0 | 13.5 | 92 | 180 |
| Example 48 | Example 30 | used | 0 | 13.7 | 95 | 120 |
| Example 49 | Example 3i | used | 0 | 13.3 | 90 | 120 |
| Example 50 | Example 32 | used | 0 | 13.5 | 97 | 120 |
| Example 51 | Example 33 | used | 0 | 13.8 | 97 | 60 |
| Example 52 | Example 34 | used | 0 | 13.7 | 95 | 60 |
| Example 53 | Example 3S | used | 0 | 13.2 | 90 | 120 |
| Example 54 | Example 36 | used | 0 | 13.6 | 95 | 180 |
| Example 55 | Example 37 | used | 0 | 13.1 | 95 | 180 |
| Example 56 | Example 38 | used | 0 | 13.5 | 95 | 180 |
| Example 57 | Example 39 | used | 0 | 13.3 | 95 | 180 |

TABLE 7

| | Acicular hematite particles washed with water after aqueous alkaline solution treatment | | | |
|---|---|---|---|---|
| Examples | Average major axial diameter (μm) | Average minor axial diameter (μm) | Geometrical standard deviation σg (-) | Aspect ratio* (-) |
| Example 40 | 0.132 | 0.0209 | 1.35 | 6.32 |
| Example 41 | 0.138 | 0.0223 | 1.38 | 6.19 |
| Example 42 | 0.137 | 0.0230 | 1.38 | 5.96 |
| Example 43 | 0.170 | 0.0301 | 1.35 | 5.65 |
| Example 44 | 0.172 | 0.0288 | 1.34 | 5.97 |
| Example 45 | 0.186 | 0.0294 | 1.35 | 6.33 |
| Example 46 | 0.203 | 0.0314 | 1.34 | 6.46 |
| Example 47 | 0.138 | 0.0222 | 1.39 | 6.22 |
| Example 48 | 0.139 | 0.0243 | 1.40 | 5.72 |
| Example 49 | 0.210 | 0.0298 | 1.44 | 7.05 |
| Example 50 | 0.209 | 0.0296 | 1.44 | 7.06 |
| Example 51 | 0.188 | 0.0285 | 1.34 | 6.60 |
| Example 52 | 0.189 | 0.0298 | 1.35 | 6.34 |
| Example 53 | 0.140 | 0.0220 | 1.36 | 6.36 |
| Example 54 | 0.140 | 0.0219 | 1.37 | 6.39 |
| Example 55 | 0.141 | 0.0213 | 1.36 | 6.62 |
| Example 56 | 0.141 | 0.0211 | 1.36 | 6.68 |
| Example 57 | 0.143 | 0.0210 | 1.36 | 6.81 |

TABLE 7-continued

| | Acicular hematite particles washed with water after aqueous alkaline solution treatment | | |
|---|---|---|---|
| Examples | $S_{BET}$ (m$^2$/g) | $S_{TEM}$ (m$^2$/g) | $S_{BET}/S_{TEM}$ (-) |
| Example 40 | 52.2 | 39.7 | 1.31 |
| Example 41 | 47.1 | 37.3 | 1.26 |
| Example 42 | 43.7 | 36.3 | 1.21 |
| Example 43 | 38.9 | 27.8 | 1.40 |
| Example 44 | 36.1 | 28.9 | 1.25 |
| Example 45 | 34.0 | 28.2 | 1.20 |
| Example 46 | 35.5 | 26.4 | 1.35 |
| Example 47 | 50.6 | 37.4 | 1.35 |
| Example 48 | 52.5 | 34.4 | 1.53 |
| Example 49 | 36.9 | 27.6 | 1.33 |
| Example 50 | 38.3 | 27.8 | 1.38 |
| Example 51 | 40.8 | 29.0 | 1.41 |
| Example 52 | 36.8 | 27.8 | 1.32 |
| Example 53 | 54.8 | 37.7 | 1.45 |
| Example 54 | 56.5 | 37.9 | 1.49 |
| Example 55 | 50.6 | 38.8 | 1.30 |
| Example 56 | 50.8 | 39.2 | 1.30 |
| Example 57 | 51.9 | 39.3 | 1.32 |

| | Acicular hematite particles washed with water after aqueous alkaline solution treatment Kind of Sintering preventive | | | | |
|---|---|---|---|---|---|
| Examples | Calculated as | Amount (wt. %) | Calculated as | Amount (wt. %) | Calculated as | Amount (wt. %) |
| Example 40 | Sn | 14.16 | — | — | — | — |
| Example 41 | Sn | 17.92 | — | — | — | — |
| Example 42 | Sn | 36.65 | — | — | $SiO_2$ | 0.60 |
| Example 43 | Sn | 1.30 | — | — | — | — |
| Example 44 | Sn | 3.14 | — | — | — | — |
| Example 45 | Sn | 9.68 | — | — | — | — |
| Example 46 | Sn | 35.60 | — | — | — | — |
| Example 47 | Sn | 72.10 | — | — | — | — |
| Example 48 | Sn | 90.01 | — | — | — | — |
| Example 49 | Sn | 53.65 | — | — | — | — |
| Example 50 | Sn | 45.89 | P | 0.26 | — | — |
| Example 51 | Sn | 35.68 | Sb | 5.16 | — | — |
| Example 52 | Sn | 9.26 | Sb | 1.86 | — | — |
| Example 53 | Sn | 48.65 | Sb | 8.62 | $SiO_2$ | 1.36 |
| Example 54 | Sn | 76.56 | Sb | 13.68 | Al | 0.98 |
| Example 55 | — | — | P | 0.72 | — | — |
| Example 56 | — | — | — | — | $SiO_2$ | 1.80 |
| Example 57 | — | — | P | 0.25 | $SiO_2$ | 0.68 |

TABLE 7-continued

Acicular hematite particles washed with water after aqueous alkaline solution treatment

| Examples | Soluble sodium salt (ppm) | Soluble sulfate (ppm) | pH value (–) | Volume resistivity (Ωcm) |
|---|---|---|---|---|
| Example 40 | 108 | 13 | 9.3 | $3.2 \times 10^6$ |
| Example 41 | 135 | 32 | 9.0 | $1.7 \times 10^6$ |
| Example 42 | 87 | 23 | 9.1 | $1.1 \times 10^6$ |
| Example 43 | 78 | 24 | 8.8 | $3.8 \times 10^7$ |
| Example 44 | 121 | 32 | 9.4 | $3.1 \times 10^7$ |
| Example 45 | 98 | 46 | 8.6 | $8.2 \times 10^6$ |
| Example 46 | 105 | 48 | 8.9 | $1.0 \times 10^6$ |
| Example 47 | 124 | 11 | 9.0 | $5.8 \times 10^5$ |
| Example 48 | 138 | 21 | 9.5 | $2.6 \times 10^5$ |
| Example 49 | 76 | 15 | 8.8 | $9.1 \times 10^5$ |
| Example 50 | 89 | 21 | 8.9 | $7.0 \times 10^5$ |
| Example 51 | 107 | 17 | 9.3 | $6.9 \times 10^5$ |
| Example 52 | 124 | 16 | 9.1 | $2.6 \times 10^6$ |
| Example 53 | 79 | 8 | 9.0 | $3.3 \times 10^5$ |
| Example 54 | 87 | 8 | 8.9 | $1.3 \times 10^5$ |
| Example 55 | 115 | 15 | 9.2 | $8.9 \times 10^8$ |
| Example 56 | 121 | 21 | 9.4 | $6.5 \times 10^8$ |
| Example 57 | 89 | 32 | 8.9 | $5.1 \times 10^8$ |

(Note) *Aspect ratio = average major axial diameter/average minor axial diameter

TABLE 8

| Comparative Examples | Kind of acicular hematite particles | Wet-pulverization step Use or non-use | Wet-pulverization step Residue on sieve (wt. %) | Heat treatment in aqueous alkaline solution pH (–) | Heat treatment in aqueous alkaline solution Temperature (° C.) | Heat treatment in aqueous alkaline solution Time (min) |
|---|---|---|---|---|---|---|
| Comparative Example 28 | Comparative Example 19 | used | 0 | — | — | — |
| Comparative Example 29 | Comparative Example 20 | used | 0 | 11.5 | 93 | 180 |
| Comparative Example 30 | Comparative Example 21 | used | 0 | 13.3 | 50 | 180 |
| Comparative Example 31 | Comparative Example 22 | unused | 18.0 | 13.3 | 90 | 180 |
| Comparative Example 32 | Comparative Example 24 | unused | 19.6 | 10.5 | 95 | 180 |
| Comparative Example 33 | Comparative Example 25 | unused | 23.6 | 13.3 | 92 | 120 |
| Comparative Example 34 | Comparative Example 26 | unused | 17.5 | 13.5 | 90 | 120 |
| Comparative Example 35 | Comparative Example 27 | used | 0 | 9.5 | 95 | 120 |

TABLE 9

Acicular hematite particles washed with water after aqueous alkaline solution treatment

| Comparative Examples | Average major axial diameter (μm) | Average minor axial diameter (μm) | Geometrical standard deviation σg (–) | Aspect ratio* (–) |
|---|---|---|---|---|
| Comparative Example 28 | 0.134 | 0.0206 | 1.35 | 6.50 |
| Comparative Example 29 | 0.134 | 0.0200 | 1.35 | 6.70 |
| Comparative Example 30 | 0.132 | 0.0218 | 1.35 | 6.06 |
| Comparative Example 31 | 0.132 | 0.0198 | 1.35 | 6.67 |
| Comparative Example 32 | 0.192 | 0.0288 | 1.35 | 6.67 |
| Comparative Example 33 | 0.192 | 0.0291 | 1.34 | 6.60 |
| Comparative Example 34 | 0.191 | 0.0302 | 1.35 | 6.32 |
| Comparative Example 35 | 0.185 | 0.0292 | 1.33 | 6.34 |

Acicular hematite particles washed with water after aqueous alkaline solution treatment

| Comparative Examples | $S_{BET}$ (m²/g) | $S_{TEM}$ (m²/g) | $S_{BET}/S_{TEM}$ (–) |
|---|---|---|---|
| Comparative Example 28 | 58.8 | 40.2 | 1.46 |
| Comparative Example 29 | 52.6 | 41.3 | 1.27 |
| Comparative Example 30 | 44.1 | 38.2 | 1.15 |

TABLE 9-continued

| | | | |
|---|---|---|---|
| Comparative Example 31 | 69.1 | 41.8 | 1.65 |
| Comparative Example 32 | 43.7 | 28.7 | 1.52 |
| Comparative Example 33 | 50.9 | 28.4 | 1.79 |
| Comparative Example 34 | 38.0 | 27.5 | 1.38 |
| Comparative Example 35 | 63.8 | 28.4 | 2.24 |

| | Acicular hematite particles washed with water after aqueous alkaline solution treatment | | | | | |
|---|---|---|---|---|---|---|
| | Kind of Sintering preventive | | Soluble sodium salt (ppm) | Soluble sulfate (ppm) | pH value (−) | Specific volume resistivity (Ωcm) |
| Comparative Examples | Calculated as | Amount (wt. %) | | | | |
| Comparative Example 28 | P | 0.46 | 658 | 354 | 7.1 | $5.1 \times 10^8$ |
| Comparative Example 29 | $SiO_2$ | 1.38 | 452 | 316 | 7.0 | $6.7 \times 10^8$ |
| Comparative Example 30 | $SiO_2$ | 0.21 | 365 | 197 | 7.7 | $7.4 \times 10^8$ |
| Comparative Example 31 | P | 0.75 | 312 | 165 | 7.9 | $8.0 \times 10^8$ |
| Comparative Example 32 | $SiO_2$ | 1.20 | 703 | 335 | 7.0 | $6.1 \times 10^8$ |
| Comparative Example 33 | P | 1.44 | 321 | 185 | 7.5 | $7.9 \times 10^8$ |
| Comparative Example 34 | $SiO_2$ | 0.23 | 376 | 167 | 7.9 | $3.7 \times 10^8$ |
| Comparative Example 35 | $SiO_2$ | 0.04 | 832 | 349 | 7.1 | $8.6 \times 10^8$ |

(Note) *Aspect ratio = average major axial diameter/average minor axial diameter

TABLE 10

| Examples | Kind of acicular hematite particles treated with aqueous alkaline solution | Surface treatment | | Coating substance | |
|---|---|---|---|---|---|
| | | Kind | Amount added (calculated as each element) (wt. %) | Calculated as | Amount (wt. %) |
| Example 58 | Example 40 | Sodium aluminate | 1.3 | Al | 1.28 |
| Example 59 | Example 41 | Water glass #3 | 0.5 | $SiO_2$ | 0.45 |
| Example 60 | Example 42 | Aluminum sulfate | 1.0 | Al | 0.99 |
| Example 61 | Example 43 | Colloidal silica | 1.0 | $SiO_2$ | 0.96 |
| Example 62 | Example 44 | Aluminum acetate | 1.5 | Al | 1.46 |
| | | Water glass#3 | 0.8 | $SiO_2$ | 0.77 |
| Example 63 | Example 45 | Aluminum sulfate | 0.3 | Al | 0.30 |
| | | Water glass #3 | 2.5 | $SiO_2$ | 2.38 |
| Example 64 | Example 46 | Sodium aluminate | 5.0 | Al | 4.76 |
| Example 65 | Example 47 | Sodium aluminate | 1.5 | Al | 1.46 |
| | | Colloidal silica | 2.5 | $SiO_2$ | 2.36 |
| Example 66 | Example 48 | Sodium aluminate | 0.2 | Al | 0.20 |
| Example 67 | Example 49 | Aluminum acetate | 10.0 | Al | 9.01 |
| | | Colloidal silica | 0.3 | $SiO_2$ | 0.28 |
| Example 68 | Example 50 | Water glass #3 | 3.0 | $SiO_2$ | 2.90 |
| Example 69 | Example 51 | Sodium aluminate | 1.8 | Al | 1.76 |
| Example 70 | Example 52 | Aluminum acetate | 0.2 | Al | 0.20 |
| Example 71 | Example 53 | Sodium aluminate | 3.0 | Al | 2.91 |
| Example 72 | Example 54 | Water glass #3 | 1.5 | $SiO_2$ | 1.45 |
| Example 73 | Example 55 | Sodium stannate | 3.0 | Sn | 2.90 |
| Example 74 | Example 56 | Stannous chloride | 5.0 | Sn | 4.71 |
| Example 75 | Example 57 | Sodium stannate | 5.5 | Sn | 5.11 |
| | | Antimony chloride | 0.5 | Sb | 0.47 |

TABLE 11

Properties of acicular hematite particles washed with water after aqueous alkaline solution treatment

| Examples | Average major axial diameter (μm) | Average minor axial diameter (μm) | Geometrical standard deviation σg (−) | Aspect ratio* (−) |
|---|---|---|---|---|
| Example 58 | 0.132 | 0.0209 | 1.35 | 6.32 |
| Example 59 | 0.137 | 0.0222 | 1.38 | 6.17 |
| Example 60 | 0.137 | 0.0231 | 1.38 | 5.93 |
| Example 61 | 0.170 | 0.0300 | 1.35 | 5.67 |
| Example 62 | 0.171 | 0.0288 | 1.35 | 5.94 |
| Example 63 | 0.187 | 0.0294 | 1.35 | 6.36 |
| Example 64 | 0.202 | 0.0313 | 1.34 | 6.45 |
| Example 65 | 0.138 | 0.0222 | 1.39 | 6.22 |
| Example 66 | 0.139 | 0.0244 | 1.40 | 5.70 |
| Example 67 | 0.209 | 0.0298 | 1.44 | 7.01 |
| Example 68 | 0.210 | 0.0296 | 1.44 | 7.09 |
| Example 69 | 0.188 | 0.0285 | 1.34 | 6.60 |
| Example 70 | 0.189 | 0.0298 | 1.35 | 6.34 |
| Example 71 | 0.141 | 0.0221 | 1.36 | 6.38 |
| Example 72 | 0.140 | 0.0220 | 1.37 | 6.36 |
| Example 73 | 0.141 | 0.0213 | 1.36 | 6.62 |
| Example 74 | 0.141 | 0.0211 | 1.36 | 6.68 |
| Example 75 | 0.143 | 0.0210 | 1.36 | 6.81 |

Properties of acicular hematite particles washed with water after aqueous alkaline solution treatment

| Examples | $S_{BET}$ (m²/g) | $S_{TEM}$ (m²/g) | $S_{BET}/S_{TEM}$ (−) |
|---|---|---|---|
| Example 58 | 51.9 | 39.7 | 1.31 |
| Example 59 | 46.9 | 37.5 | 1.25 |
| Example 60 | 43.2 | 36.1 | 1.20 |
| Example 61 | 38.7 | 27.9 | 1.39 |
| Example 62 | 36.0 | 29.0 | 1.24 |
| Example 63 | 35.3 | 28.2 | 1.25 |
| Example 64 | 36.5 | 26.5 | 1.38 |
| Example 65 | 52.3 | 37.4 | 1.40 |
| Example 66 | 51.5 | 34.3 | 1.50 |
| Example 67 | 40.0 | 27.7 | 1.45 |
| Example 68 | 40.8 | 27.8 | 1.47 |
| Example 69 | 40.1 | 29.0 | 1.38 |
| Example 70 | 36.5 | 27.8 | 1.31 |
| Example 71 | 55.1 | 37.5 | 1.47 |
| Example 72 | 55.6 | 37.7 | 1.47 |
| Example 73 | 51.0 | 38.8 | 1.31 |
| Example 74 | 52.6 | 39.2 | 1.34 |
| Example 75 | 52.6 | 39.3 | 1.34 |

Properties of acicular hematite particles washed with water after aqueous alkaline solution treatment
Kind of Sintering preventive

| Examples | Calculated as | Amount (wt. %) | Calculated as | Amount (wt. %) | Calculated as | Amount (wt. %) |
|---|---|---|---|---|---|---|
| Example 58 | Sn | 13.75 | — | — | — | — |
| Example 59 | Sn | 17.68 | — | — | — | — |
| Example 60 | Sn | 34.52 | — | — | SiO₂ | 0.58 |
| Example 61 | Sn | 1.28 | — | — | — | — |
| Example 62 | Sn | 3.06 | — | — | — | — |
| Example 63 | Sn | 9.22 | — | — | — | — |
| Example 64 | Sn | 33.81 | — | — | — | — |
| Example 65 | Sn | 70.12 | — | — | — | — |
| Example 66 | Sn | 88.82 | — | — | — | — |
| Example 67 | Sn | 48.77 | — | — | — | — |
| Example 68 | Sn | 44.00 | P | 0.25 | — | — |
| Example 69 | Sn | 34.68 | Sb | 5.11 | — | — |
| Example 70 | Sn | 8.92 | Sb | 1.83 | — | — |
| Example 71 | Sn | 47.32 | Sb | 8.58 | SiO₂ | 1.36 |
| Example 72 | Sn | 74.82 | Sb | 12.99 | Al | 0.98 |
| Example 73 | — | — | P | 0.69 | — | — |
| Example 74 | — | — | — | — | SiO₂ | 1.71 |
| Example 75 | — | — | P | 0.23 | SiO₂ | 0.64 |

TABLE 11-continued

Properties of acicular hematite particles washed with water after aqueous alkaline solution treatment

| Examples | Soluble sodium salt (ppm) | Soluble sulfate (ppm) | pH value (−) | Volume resistivity (Ωcm) |
|---|---|---|---|---|
| Example 58 | 97 | 9 | 9.3 | $4.1 \times 10^6$ |
| Example 59 | 76 | 13 | 9.0 | $1.8 \times 10^6$ |
| Example 60 | 65 | 6 | 9.4 | $1.3 \times 10^6$ |
| Example 61 | 85 | 12 | 8.9 | $5.0 \times 10^7$ |
| Example 62 | 56 | 2 | 9.6 | $4.5 \times 10^7$ |
| Example 63 | 123 | 12 | 9.3 | $1.2 \times 10^7$ |
| Example 64 | 76 | 10 | 9.0 | $2.3 \times 10^6$ |
| Example 65 | 107 | 7 | 9.2 | $6.9 \times 10^6$ |
| Example 66 | 65 | 5 | 9.6 | $2.5 \times 10^6$ |
| Example 67 | 135 | 34 | 8.8 | $2.4 \times 10^6$ |
| Example 68 | 87 | 12 | 9.1 | $9.3 \times 10^5$ |
| Example 69 | 54 | 11 | 9.0 | $8.8 \times 10^5$ |
| Example 70 | 46 | 2 | 9.2 | $2.7 \times 10^6$ |
| Example 71 | 68 | 16 | 9.0 | $6.4 \times 10^5$ |
| Example 72 | 100 | 11 | 8.9 | $2.5 \times 10^5$ |
| Example 73 | 89 | 12 | 9.2 | $6.8 \times 10^8$ |
| Example 74 | 78 | 6 | 9.3 | $3.2 \times 10^8$ |
| Example 75 | 66 | 11 | 9.0 | $1.1 \times 10^8$ |

(Note) *Aspect ratio = average major axial diameter/average minor axial diameter

TABLE 12

| Examples | Kind of high-density acicular hematite particles | Heat treatment Temperature (° C.) | Heat treatment Time (min) | Coating substance Calculated as | Coating substance Amount (wt. %) |
|---|---|---|---|---|---|
| Example 76 | Example 73 | 400 | 60 | Sn | 2.92 |
| Example 77 | Example 74 | 350 | 60 | Sn | 4.75 |
| Example 78 | Example 75 | 380 | 90 | Sn | 5.32 |
|  |  |  |  | Sb | 0.49 |

TABLE 13

Properties of acicular hematite particles washed with water after treatment with tin compound

| Examples | Average major axial diameter (μm) | Average minor axial diameter (μm) | Geometrical standard deviation σg (−) | Aspect ratio* (−) |
|---|---|---|---|---|
| Example 76 | 0.141 | 0.0213 | 1.36 | 6.62 |
| Example 77 | 0.141 | 0.0210 | 1.36 | 6.71 |
| Example 78 | 0.143 | 0.0209 | 1.36 | 6.84 |

Properties of acicular hematite particles washed with water after treatment with tin compound

| Examples | $S_{BET}$ (m²/g) | $S_{TEM}$ (m²/g) | $S_{BET}/S_{TEM}$ (−) |
|---|---|---|---|
| Example 76 | 50.6 | 38.8 | 1.30 |
| Example 77 | 51.1 | 39.4 | 1.30 |
| Example 78 | 51.9 | 39.5 | 1.31 |

TABLE 13-continued

Properties of acicular hematite particles washed with water after treatment with tin compound
Kind of Sintering preventive

| Examples | Calculated as | Amount (wt. %) |
|---|---|---|
| Example 76 | P | 0.70 |
| Example 77 | SiO$_2$ | 1.74 |
| Example 78 | P | 0.24 |
|  | SiO$_2$ | 0.67 |

Properties of acicular hematite particles washed with water after treatment with tin compound

| Examples | Soluble sodium salt (ppm) | Soluble sulfate (ppm) | pH value (-) | Volume resistivity (Ωcm) |
|---|---|---|---|---|
| Example 76 | 125 | 15 | 8.9 | 2.6 × 10$^6$ |
| Example 77 | 115 | 26 | 9.0 | 8.1 × 10$^6$ |
| Example 78 | 91 | 32 | 9.0 | 1.6 × 10$^6$ |

(Note)
*Aspect ratio = average major axial diameter/average minor axial diameter

TABLE 14

| | Production of non-magnetic coating material | | Non-magnetic coating material Viscosity (cP) |
|---|---|---|---|
| Examples | Kind of acicular hematite particles | Weight ratio of particles to resin (-) | |
| Example 79 | Example 40 | 5.0 | 410 |
| Example 80 | Example 41 | 5.0 | 435 |
| Example 81 | Example 42 | 5.0 | 384 |
| Example 82 | Example 43 | 5.0 | 333 |
| Example 83 | Example 44 | 5.0 | 205 |
| Example 84 | Example 45 | 5.0 | 179 |
| Example 85 | Example 46 | 5.0 | 128 |
| Example 86 | Example 47 | 5.0 | 742 |
| Example 87 | Example 48 | 5.0 | 896 |
| Example 88 | Example 49 | 5.0 | 205 |
| Example 89 | Example 50 | 5.0 | 230 |
| Example 90 | Example 51 | 5.0 | 512 |
| Example 91 | Example 52 | 5.0 | 384 |
| Example 92 | Example 53 | 5.0 | 768 |
| Example 93 | Example 54 | 5.0 | 819 |
| Example 94 | Example 58 | 5.0 | 384 |
| Example 95 | Example 59 | 5.0 | 384 |

Non-magnetic undercoat layer

| Examples | Thickness of coating layer (μm) | Gloss (%) | Surface roughness Ra (nm) | Young's modulus (relative value) |
|---|---|---|---|---|
| Example 79 | 3.5 | 190 | 7.2 | 126 |
| Example 80 | 3.4 | 186 | 7.5 | 124 |
| Example 81 | 3.4 | 181 | 7.8 | 125 |
| Example 82 | 3.4 | 198 | 6.8 | 129 |
| Example 83 | 3.3 | 196 | 6.8 | 127 |
| Example 84 | 3.5 | 194 | 7.6 | 133 |
| Example 85 | 3.5 | 188 | 8.4 | 131 |
| Example 86 | 3.4 | 185 | 8.8 | 124 |
| Example 87 | 3.3 | 180 | 10.4 | 123 |
| Example 88 | 3.5 | 187 | 8.0 | 134 |
| Example 89 | 3.4 | 191 | 7.8 | 136 |
| Example 90 | 3.5 | 195 | 7.4 | 128 |
| Example 91 | 3.4 | 199 | 7.0 | 131 |
| Example 92 | 3.5 | 185 | 8.6 | 124 |
| Example 93 | 3.5 | 185 | 8.3 | 126 |
| Example 94 | 3.4 | 185 | 7.0 | 128 |
| Example 95 | 3.5 | 180 | 7.3 | 125 |

TABLE 15

| | Production of non-magnetic coating material | | Non-magnetic coating material Viscosity (cP) |
|---|---|---|---|
| Examples | Kind of acicular hematite particles | Weight ratio of particles to resin (-) | |
| Example 96 | Example 60 | 5.0 | 307 |
| Example 97 | Example 61 | 5.0 | 333 |
| Example 98 | Example 62 | 5.0 | 179 |
| Example 99 | Example 63 | 5.0 | 128 |
| Example 100 | Example 64 | 5.0 | 102 |
| Example 101 | Example 65 | 5.0 | 512 |
| Example 102 | Example 66 | 5.0 | 768 |
| Example 103 | Example 67 | 5.0 | 179 |
| Example 104 | Example 68 | 5.0 | 205 |
| Example 105 | Example 69 | 5.0 | 384 |
| Example 106 | Example 70 | 5.0 | 230 |
| Example 107 | Example 71 | 5.0 | 410 |
| Example 108 | Example 72 | 5.0 | 435 |
| Example 109 | Example 76 | 5.0 | 384 |
| Example 110 | Example 77 | 5.0 | 435 |
| Example 111 | Example 78 | 5.0 | 512 |

Non-magnetic undercoat layer

| Examples | Thickness of coating layer (μm) | Gloss (%) | Surface roughness Ra (nm) | Young's modulus (relative value) |
|---|---|---|---|---|
| Example 96 | 3.4 | 191 | 7.3 | 127 |
| Example 97 | 3.4 | 205 | 6.8 | 131 |
| Example 98 | 3.4 | 200 | 6.5 | 131 |
| Example 99 | 3.3 | 193 | 7.4 | 136 |
| Example 100 | 3.4 | 195 | 7.9 | 134 |
| Example 101 | 3.4 | 190 | 8.3 | 125 |
| Example 102 | 3.5 | 188 | 8.6 | 125 |
| Example 103 | 3.5 | 193 | 8.8 | 136 |
| Example 104 | 3.4 | 194 | 8.5 | 139 |
| Example 105 | 3.5 | 196 | 8.0 | 131 |
| Example 106 | 3.4 | 207 | 6.8 | 135 |
| Example 107 | 3.3 | 190 | 7.4 | 127 |
| Example 108 | 3.4 | 195 | 7.3 | 127 |
| Example 109 | 3.4 | 195 | 7.5 | 128 |
| Example 110 | 3.4 | 198 | 7.2 | 128 |
| Example 111 | 3.4 | 201 | 6.9 | 129 |

TABLE 16

| | Production of non-magnetic coating material | | Non-magnetic coating material Viscosity (cP) |
|---|---|---|---|
| Comparative Examples | Kind of acicular hematite particles | Weight ratio of particles to resin (-) | |
| Comparative Example 36 | Comparative Example 1 | 5.0 | 25600 |
| Comparative Example 37 | Comparative Example 15 | 5.0 | 128 |
| Comparative Example 38 | Comparative Example 16 | 5.0 | 102 |
| Comparative Example 39 | Comparative Example 3 | 5.0 | 20480 |
| Comparative Example 40 | Comparative Example 17 | 5.0 | 768 |

TABLE 16-continued

| Comparative Examples | | | |
|---|---|---|---|
| Comparative Example 41 | Comparative Example 18 | 5.0 | 563 |
| Comparative Example 42 | Comparative Example 28 | 5.0 | 435 |
| Comparative Example 43 | Comparative Example 29 | 5.0 | 405 |
| Comparative Example 44 | Comparative Example 30 | 5.0 | 384 |
| Comparative Example 45 | Comparative Example 31 | 5.0 | 640 |
| Comparative Example 46 | Comparative Example 23 | 5.0 | 512 |
| Comparative Example 47 | Comparative Example 32 | 5.0 | 435 |
| Comparative Example 48 | Comparative Example 33 | 5.0 | 435 |
| Comparative Example 49 | Comparative Example 34 | 5.0 | 410 |
| Comparative Example 50 | Comparative Example 35 | 5.0 | 2560 |

| Comparative Examples | Non-magnetic undercoat layer | | | |
|---|---|---|---|---|
| | Thickness of coating layer ($\mu$m) | Gloss (%) | Surface roughness Ra (nm) | Young's modulus (relative value) |
| Comparative Example 36 | 3.6 | 68 | 112.0 | 76 |
| Comparative Example 37 | 3.5 | 45 | 181.0 | 58 |
| Comparative Example 38 | 3.5 | 89 | 78.5 | 86 |
| Comparative Example 39 | 3.7 | 76 | 84.0 | 77 |
| Comparative Example 40 | 3.5 | 135 | 33.8 | 103 |
| Comparative Example 41 | 3.5 | 159 | 23.1 | 105 |
| Comparative Example 42 | 3.5 | 170 | 15.9 | 110 |
| Comparative Example 43 | 3.6 | 176 | 13.1 | 112 |
| Comparative Example 44 | 3.5 | 175 | 13.2 | 110 |
| Comparative Example 45 | 3.6 | 165 | 17.0 | 105 |
| Comparative Example 46 | 3.7 | 147 | 21.7 | 109 |
| Comparative Example 47 | 3.6 | 167 | 18.6 | 112 |
| Comparative Example 48 | 3.8 | 171 | 16.2 | 110 |
| Comparative Example 49 | 3.5 | 175 | 14.4 | 114 |
| Comparative Example 50 | 3.6 | 148 | 22.7 | 104 |

TABLE 17

Magnetic recording medium using magnetic particles containing iron as main ingredient

| Examples | Kind of Non-magnetic undercoat layer | Kind of magnetic particles containing iron as main ingredient | Weight ratio of magnetic particles to resin (–) |
|---|---|---|---|
| Example 112 | Example 79 | [major axial diameter = 0.10 $\mu$m; minor axial diameter = 0.016 $\mu$m; aspect ratio = 6.3; | 5.0 |
| Example 113 | Example 80 | | 5.0 |
| Example 114 | Example 81 | $Hc = 1926$ Oe; | 5.0 |
| Example 115 | Example 82 | $\delta s = 131.0$ emu/g; | 5.0 |
| Example 116 | Example 83 | pH value = 10.3; | 5.0 |
| Example 117 | Example 84 | Al content = 4.11 wt. %; | 5.0 |
| Example 118 | Example 85 | Co content = 5.87 wt. %] | 5.0 |
| Example 119 | Example 86 | [major axial diameter = 0.12 $\mu$m; | 5.0 |
| Example 120 | Example 87 | minor axial diameter = 0.018 $\mu$m; | 5.0 |
| Example 121 | Example 88 | aspect ratio = 7.0; | 5.0 |
| Example 122 | Example 89 | $Hc = 1770$ Oe; | 5.0 |
| Example 123 | Example 90 | $\delta s = 138.0$ emu/g; | 5.0 |
| Example 124 | Example 91 | pH value = 9.8; | 5.0 |
| Example 125 | Example 92 | Al content = 2.27 wt. %; | 5.0 |
| Example 126 | Example 93 | Co content = 3.72 wt. %] | 5.0 |

Magnetic recording medium using magnetic particles containing iron as main ingredient

| Examples | Thickness of magnetic layer ($\mu$m) | Coercive force (Oe) | Br/Bm (–) | Gloss (%) | Surface roughness Ra (nm) |
|---|---|---|---|---|---|
| Example 112 | 1.1 | 2022 | 0.88 | 210 | 7.0 |
| Example 113 | 1.1 | 2035 | 0.88 | 206 | 7.0 |
| Example 114 | 1.1 | 2041 | 0.88 | 205 | 7.6 |
| Example 115 | 1.0 | 2087 | 0.88 | 221 | 6.4 |
| Example 116 | 1.1 | 2036 | 0.88 | 223 | 6.3 |
| Example 117 | 1.1 | 2026 | 0.87 | 212 | 7.0 |
| Example 118 | 1.1 | 2016 | 0.88 | 208 | 7.4 |
| Example 119 | 1.1 | 1856 | 0.89 | 203 | 8.0 |
| Example 120 | 1.2 | 1836 | 0.87 | 196 | 8.6 |
| Example 121 | 1.1 | 1897 | 0.88 | 200 | 7.6 |
| Example 122 | 1.0 | 1893 | 0.89 | 211 | 7.4 |
| Example 123 | 1.1 | 1834 | 0.89 | 209 | 7.2 |
| Example 124 | 1.1 | 1867 | 0.90 | 227 | 6.5 |
| Example 125 | 1.2 | 1870 | 0.88 | 213 | 7.0 |
| Example 126 | 1.1 | 1867 | 0.88 | 216 | 7.0 |

Magnetic recording medium using magnetic particles containing iron as main ingredient

| Examples | Young's modulus (relative value) | Linear absorption coefficient ($\mu$m$^{-1}$) | Surface resistivity ($\Omega$/sq) | Corrosion property Rate of change in coercive force (%) | Rate of change in Bm (%) |
|---|---|---|---|---|---|
| Example 112 | 131 | 1.23 | $9.6 \times 10^7$ | 7.9 | 6.9 |
| Example 113 | 130 | 1.24 | $5.1 \times 10^7$ | 6.4 | 5.4 |
| Example 114 | 132 | 1.21 | $9.8 \times 10^7$ | 5.3 | 5.8 |
| Example 115 | 134 | 1.27 | $4.6 \times 10^7$ | 5.7 | 6.9 |
| Example 116 | 134 | 1.29 | $4.4 \times 10^7$ | 7.3 | 6.4 |
| Example 117 | 138 | 1.31 | $1.8 \times 10^8$ | 3.7 | 4.8 |
| Example 118 | 135 | 1.31 | $8.8 \times 10^7$ | 6.4 | 7.9 |
| Example 119 | 130 | 1.20 | $6.4 \times 10^6$ | 4.8 | 6.3 |
| Example 120 | 131 | 1.20 | $7.8 \times 10^5$ | 5.3 | 7.2 |
| Example 121 | 139 | 1.30 | $8.6 \times 10^6$ | 8.6 | 7.6 |
| Example 122 | 141 | 1.31 | $7.3 \times 10^6$ | 7.4 | 7.9 |
| Example 123 | 132 | 1.28 | $1.0 \times 10^7$ | 5.8 | 6.8 |
| Example 124 | 133 | 1.26 | $7.8 \times 10^7$ | 6.7 | 5.2 |
| Example 125 | 130 | 1.23 | $6.5 \times 10^6$ | 6.6 | 4.8 |
| Example 126 | 130 | 1.22 | $8.7 \times 10^5$ | 3.6 | 3.5 |

TABLE 18

Magnetic recording medium using magnetic particles containing iron as main ingredient

| Examples | Kind of Non-magnetic undercoat layer | Kind of magnetic particles containing iron as main ingredient | Weight ratio of magnetic particles to resin (−) |
|---|---|---|---|
| Example 127 | Example 94 | [major axial diameter = 0.10 μm; minor axial diameter = 0.016 μm; aspect ratio = 6.3; $H_c$ = 1926 Oe; $\delta_s$ = 131.0 emu/g; pH value = 10.3; Al content = 4.11 wt. %; Co content = 5.87 wt. %] | 5.0 |
| Example 128 | Example 95 | | 5.0 |
| Example 129 | Example 96 | | 5.0 |
| Example 130 | Example 97 | | 5.0 |
| Example 131 | Example 98 | | 5.0 |
| Example 132 | Example 99 | | 5.0 |
| Example 133 | Example 100 | | 5.0 |
| Example 134 | Example 101 | [major axial diameter = 0.12 μm; minor axial diameter = 0.018 μm; aspect ratio = 7.0; $H_c$ = 1770 Oe; $\delta_s$ = 138.0 emu/g; pH value = 9.8; Al content = 2.27 wt. %; Co content = 3.72 wt. %] | 5.0 |
| Example 135 | Example 102 | | 5.0 |
| Example 136 | Example 103 | | 5.0 |
| Example 137 | Example 104 | | 5.0 |
| Example 138 | Example 105 | | 5.0 |
| Example 139 | Example 106 | | 5.0 |
| Example 140 | Example 107 | | 5.0 |
| Example 141 | Example 108 | | 5.0 |
| Example 142 | Example 109 | | 5.0 |
| Example 143 | Example 110 | | 5.0 |
| Example 144 | Example 111 | | 5.0 |

Magnetic recording medium using magnetic particles containing iron as main ingredient

| Examples | Thickness of magnetic layer (μm) | Coercive force (Oe) | Br/Bm (−) | Gloss (%) | Surface roughness Ra (nm) |
|---|---|---|---|---|---|
| Example 127 | 1.1 | 2032 | 0.89 | 223 | 6.8 |
| Example 128 | 1.1 | 2043 | 0.88 | 215 | 7.0 |
| Example 129 | 1.1 | 2036 | 0.89 | 209 | 7.3 |
| Example 130 | 1.0 | 2075 | 0.88 | 220 | 6.4 |
| Example 131 | 1.1 | 2046 | 0.90 | 225 | 6.2 |
| Example 132 | 1.1 | 2050 | 0.89 | 227 | 6.8 |
| Example 133 | 1.2 | 2043 | 0.90 | 219 | 7.2 |
| Example 134 | 1.2 | 1864 | 0.90 | 218 | 7.6 |
| Example 135 | 1.2 | 1845 | 0.88 | 209 | 9.0 |
| Example 136 | 1.1 | 1887 | 0.88 | 210 | 7.4 |
| Example 137 | 1.1 | 1895 | 0.90 | 217 | 7.0 |
| Example 138 | 1.0 | 1845 | 0.90 | 217 | 7.0 |
| Example 139 | 1.1 | 1876 | 0.91 | 236 | 6.1 |
| Example 140 | 1.1 | 1881 | 0.88 | 218 | 6.8 |
| Example 141 | 1.1 | 1875 | 0.89 | 223 | 6.7 |
| Example 142 | 1.2 | 1881 | 0.89 | 211 | 7.5 |
| Example 143 | 1.1 | 1872 | 0.90 | 215 | 7.3 |
| Example 144 | 1.1 | 1865 | 0.90 | 216 | 7.0 |

Magnetic recording medium using magnetic particles containing iron as main ingredient

| | | | Corrosion property | |
|---|---|---|---|---|
| Examples | Young's modulus (relative value) | Linear absorption coefficient (μm$^{-1}$) | Surface resistivity (Ω/sq) | Rate of change in coercive force (%) | Rate of change in Bm (%) |
|---|---|---|---|---|---|
| Example 127 | 134 | 1.24 | 9.6 × 10$^7$ | 4.5 | 4.7 |
| Example 128 | 130 | 1.24 | 5.3 × 10$^7$ | 5.4 | 4.9 |
| Example 129 | 133 | 1.23 | 1.0 × 10$^8$ | 4.5 | 4.7 |
| Example 130 | 136 | 1.27 | 4.6 × 10$^8$ | 5.5 | 6.6 |
| Example 131 | 137 | 1.29 | 4.8 × 10$^8$ | 6.8 | 6.3 |
| Example 132 | 141 | 1.32 | 2.5 × 10$^8$ | 3.2 | 3.8 |
| Example 133 | 138 | 1.31 | 9.9 × 10$^7$ | 3.6 | 4.7 |
| Example 134 | 130 | 1.21 | 7.2 × 10$^6$ | 3.7 | 5.1 |
| Example 135 | 131 | 1.21 | 8.5 × 10$^5$ | 5.0 | 6.4 |
| Example 136 | 139 | 1.30 | 9.0 × 10$^6$ | 6.8 | 6.5 |
| Example 137 | 144 | 1.30 | 8.7 × 10$^6$ | 6.1 | 6.0 |
| Example 138 | 132 | 1.28 | 2.1 × 10$^7$ | 4.7 | 5.5 |
| Example 139 | 140 | 1.27 | 8.4 × 10$^7$ | 5.4 | 4.1 |
| Example 140 | 134 | 1.23 | 8.0 × 10$^6$ | 2.9 | 3.7 |
| Example 141 | 135 | 1.23 | 9.8 × 10$^5$ | 2.8 | 2.9 |
| Example 142 | 133 | 1.23 | 3.6 × 10$^8$ | 7.2 | 6.8 |
| Example 143 | 134 | 1.23 | 2.1 × 10$^8$ | 8.1 | 6.8 |
| Example 144 | 135 | 1.24 | 9.6 × 10$^7$ | 6.0 | 5.2 |

TABLE 19

Magnetic recording medium using magnetic particles containing iron as main ingredient

| Comparative Examples | Kind of Non-magnetic undercoat layer | Kind of magnetic particles containing iron as main ingredient | Weight ratio of magnetic particles to resin (−) |
|---|---|---|---|
| Comparative Example 51 | Comparative Example 36 | [major axial diameter = 0.10 μm; minor axial diameter = 0.016 μm; aspect ratio = 6.3; $H_c$ = 1926 Oe; $\delta_s$ = 131.0 emu/g; pH value = 10.3; Al content = 4.11 wt. %; Co content = 5.87 wt. %] | 5.0 |
| Comparative Example 52 | Comparative Example 37 | | 5.0 |
| Comparative Example 53 | Comparative Example 38 | | 5.0 |
| Comparative Example 54 | Comparative Example 39 | | 5.0 |
| Comparative Example 55 | Comparative Example 40 | | 5.0 |
| Comparative Example 56 | Comparative Example 41 | | 5.0 |
| Comparative Example 57 | Comparative Example 42 | | 5.0 |
| Comparative Example 58 | Comparative Example 43 | | 5.0 |
| Comparative Example 59 | Comparative Example 44 | | 5.0 |
| Comparative Example 60 | Comparative Example 45 | | 5.0 |
| Comparative Example 61 | Comparative Example 46 | | 5.0 |
| Comparative Example 62 | Comparative Example 47 | | 5.0 |
| Comparative Example 63 | Comparative Example 48 | | 5.0 |
| Comparative Example 64 | Comparative Example 49 | | 5.0 |
| Comparative Example 65 | Comparative Example 50 | | 5.0 |

Magnetic recording medium using magnetic particles containing iron as main ingredient

| Comparative Examples | Thickness of magnetic layer (μm) | Coercive force (Oe) | Br/Bm (−) | Gloss (%) | Surface roughness Ra (nm) |
|---|---|---|---|---|---|
| Comparative Example 51 | 1.3 | 1976 | 0.77 | 123 | 76.5 |
| Comparative Example 52 | 1.2 | 1987 | 0.81 | 132 | 68.3 |
| Comparative Example 53 | 1.2 | 1980 | 0.82 | 165 | 31.6 |
| Comparative Example 54 | 1.2 | 1991 | 0.78 | 154 | 46.2 |
| Comparative Example 55 | 1.2 | 2001 | 0.83 | 175 | 17.9 |
| Comparative Example 56 | 1.3 | 2010 | 0.84 | 187 | 13.2 |
| Comparative Example 57 | 1.1 | 2018 | 0.86 | 191 | 11.8 |
| Comparative Example 58 | 1.3 | 2028 | 0.87 | 194 | 11.6 |

TABLE 19-continued

| Comparative Example | | | | | |
|---|---|---|---|---|---|
| Comparative Example 59 | 1.1 | 1999 | 0.86 | 190 | 12.6 |
| Comparative Example 60 | 1.2 | 2007 | 0.84 | 177 | 14.7 |
| Comparative Example 61 | 1.1 | 1989 | 0.84 | 165 | 21.6 |
| Comparative Example 62 | 1.0 | 2011 | 0.85 | 181 | 13.8 |
| Comparative Example 63 | 1.3 | 1997 | 0.85 | 188 | 12.1 |
| Comparative Example 64 | 1.3 | 2023 | 0.85 | 188 | 11.9 |
| Comparative Example 65 | 1.2 | 2017 | 0.84 | 165 | 23.8 |

Magnetic recording medium using magnetic particles containing iron as main ingredient

| Comparative Examples | Young's modulus (relative value) | Linear absorption coefficient ($\mu m^{-1}$) | Surface resistivity ($\Omega$/sq) | Corrosion property | |
|---|---|---|---|---|---|
| | | | | Rate of change in coercive force (%) | Rate of change in Bm (%) |
| Comparative Example 51 | 90 | 0.84 | $8.9 \times 10^8$ | 27.5 | 25.4 |
| Comparative Example 52 | 73 | 0.90 | $8.3 \times 10^8$ | 38.9 | 31.1 |
| Comparative Example 53 | 96 | 0.95 | $9.6 \times 10^8$ | 49.8 | 36.8 |
| Comparative Example 54 | 89 | 0.99 | $1.1 \times 10^9$ | 28.2 | 23.7 |
| Comparative Example 55 | 113 | 1.09 | $1.3 \times 10^9$ | 46.9 | 39.7 |
| Comparative Example 56 | 116 | 1.13 | $8.7 \times 10^8$ | 37.6 | 33.3 |
| Comparative Example 57 | 121 | 1.15 | $2.3 \times 10^9$ | 17.1 | 15.8 |
| Comparative Example 58 | 116 | 1.15 | $1.0 \times 10^{10}$ | 14.2 | 13.8 |
| Comparative Example 59 | 121 | 1.14 | $7.2 \times 10^9$ | 16.4 | 16.7 |
| Comparative Example 60 | 121 | 1.17 | $3.6 \times 10^9$ | 16.3 | 19.0 |
| Comparative Example 61 | 116 | 1.19 | $1.8 \times 10^9$ | 37.4 | 31.6 |
| Comparative Example 62 | 121 | 1.19 | $4.1 \times 10^9$ | 18.9 | 23.1 |
| Comparative Example 63 | 119 | 1.17 | $7.2 \times 10^9$ | 15.7 | 18.5 |
| Comparative Example 64 | 123 | 1.18 | $6.5 \times 10^9$ | 18.5 | 16.9 |
| Comparative Example 65 | 118 | 1.06 | $9.6 \times 10^8$ | 23.7 | 24.8 |

What is claimed is:

1. A magnetic recording medium comprising:
a non-magnetic substrate;
a non-magnetic undercoat layer formed on said magnetic substrate comprising high-density acicular hematite particles and a coat comprising an oxide of tin or oxides of tin and antimony, formed on at least a part of surfaces of said acicular hematite particles, said particles having an average major axial diameter of not more than 0.3 $\mu$m, a pH value of not less than 8, a soluble sodium salt content of not more than 300 ppm, calculated as Na, a soluble sulfate content of not more than 150 ppm, calculated as SO4, and a volume resistivity of $10^3$ to $5 \times 10^7$ $\Omega$cm and a binder resin; and
a magnetic recording layer comprising magnetic particles containing iron as a main ingredient and a binder resin, formed on said non-magnetic undercoat layer.

2. A magnetic recording medium according to claim 1, wherein said magnetic particles containing iron as a main ingredient comprise 50 to 99% by weight of iron, 0.05 to 10% by weight of aluminum, and at least one selected from the group consisting of Co, Ni, P, Si, Zn, Ti, Cu, B, Nd, La and Y.

3. A magnetic recording medium according to claim 1, wherein said magnetic particles containing iron as a main ingredient comprise 50 to 99% by weight of iron, 0.05 to 10% by weight of aluminum, and at least one rare earth metal selected from the group consisting of Nd, La and Y.

4. A magnetic recording medium according to claim 1, wherein said magnetic particles containing iron as a main ingredient have an average major axial diameter of 0.01 to 0.50 $\mu$m, an average minor axial diameter of 0.0007 to 0.17 $\mu$m, an aspect ratio of not less than 3:1, a resin adsorptivity of not less than 65%, a coercive force of 1200 to 3200 Oe, and a saturation magnetization of 100 to 170 emu/g.

5. A magnetic recording medium according to claim 1, which further have an coercive force of 900 to 3500 Oe, a squareness of 0.85 to 0.95, a gloss of 195 to 300%, a surface roughness of not more than 11.0 nm, a linear adsorption coefficient of 1.10 to 2.00 $\mu m^{-1}$, a surface resistivity of $10^4$ to $5 \times 10^8$ $\Omega$/sq.

6. A magnetic recording medium according to claim 1, which further have a percentage of change in said coercive force of not more than 10.0%, and a percentage of change in said saturation magnetization flux of not more than 10.0%.

7. A magnetic recording medium according to claim 1, wherein said high-density acicular hematite particles further comprise a coat comprising at least one compound selected from the group consisting of a hydroxide of aluminum, an oxide of aluminum, a hydroxide of silicon and an oxide of silicon.

8. A magnetic recording medium according to claim 7, wherein the amount of said hydroxide of aluminum or said oxide of aluminum contained in said coat is 0.01 to 50% by weight, calculated as Al, based of the weight of said acicular hematite particles.

9. A magnetic recording medium according to claim 7, wherein the amount of said hydroxide of silicon or said oxide of silicon contained in said coat is 0.01 to 50% by weight, calculated as $SiO_2$, based of the weight of said acicular hematite particles.

10. A magnetic recording medium according to claim 1, wherein the amount of said oxide of tin is 0.5 to 500% by weight, calculated as Sn, based on the weight of said acicular hematite particles.

11. A magnetic recording medium according to claim 1, wherein the amount of said oxide of antimony when present is 0.05 to 50% by weight, calculated as Sb, based of the weight of said acicular hematite particles.

12. A magnetic recording medium according to claim 1, wherein both Sn and Sb are present in a weight ratio of tin to antimony of 20:1 to 1:1.

13. A magnetic recording medium according to claim 1, wherein said high-density acicular hematite particles have an aspect ratio (average major axial diameter:average minor axial diameter) of not less than 2:1.

14. A magnetic recording medium according to claim 1, wherein said high-density acicular hematite particles have a degree of densification ($S_{BET}/S_{TEM}$) of 0.5 to 2.5, wherein $S_{BET}$ represents a specific surface area measured by a BET method, and $S_{TEM}$ represents a surface area calculated from values of major axial diameter and minor axial diameter obtained by measurement of particles on electron microscope photograph.

15. A magnetic recording medium according to claim 1, wherein said high-density acicular hematite particles have a particle size distribution of major axial diameter represented by a geometrical standard deviation of not more than 1.50.

16. A magnetic recording medium according to claim 1, wherein said high-density acicular hematite particles have a BET specific surface area of not less than 35 m$^2$/g.

* * * * *